(12) United States Patent
Monk et al.

(10) Patent No.: US 11,720,631 B2
(45) Date of Patent: Aug. 8, 2023

(54) TOOL TO BUILD AND STORE A DATA MODEL AND QUERIES FOR A GRAPH DATABASE

(71) Applicant: Neo4j Sweden AB, San Mateo, CA (US)

(72) Inventors: Daniel Eric Monk, Frederick, MD (US); Navneet Mathur, Mountain View, CA (US)

(73) Assignee: Neo4j Sweden AB, San Mateo, CA (US)

( * ) Notice: Subject to any disclaimer, the term of this patent is extended or adjusted under 35 U.S.C. 154(b) by 106 days.

(21) Appl. No.: 17/236,842

(22) Filed: Apr. 21, 2021

(65) Prior Publication Data

US 2022/0342932 A1 Oct. 27, 2022

(51) Int. Cl.

| | |
|---|---|
| *G06F 16/901* | (2019.01) |
| *G06F 16/28* | (2019.01) |
| *G06F 16/23* | (2019.01) |
| *G06F 16/245* | (2019.01) |
| *G06F 21/62* | (2013.01) |
| *G06F 3/04847* | (2022.01) |

(52) U.S. Cl.
CPC ...... *G06F 16/9024* (2019.01); *G06F 16/2358* (2019.01); *G06F 16/245* (2019.01); *G06F 16/288* (2019.01); *G06F 21/6218* (2013.01); *G06F 3/04847* (2013.01)

(58) Field of Classification Search
CPC .. G06F 16/9024; G06F 16/245; G06F 16/288; G06F 16/2358; G06F 21/6218; G06F 3/04847
USPC .......................................................... 707/741
See application file for complete search history.

(56) References Cited

U.S. PATENT DOCUMENTS

| | | | |
|---|---|---|---|
| 2018/0144004 A1* | 5/2018 | Bedi | G06F 16/9024 |
| 2018/0210966 A1* | 7/2018 | Bedi | G06F 16/2452 |
| 2019/0258746 A1* | 8/2019 | Zizka | G06F 16/9038 |
| 2019/0362052 A1* | 11/2019 | Hurst | G06Q 50/184 |

* cited by examiner

*Primary Examiner* — Joshua Bullock
(74) *Attorney, Agent, or Firm* — Van Pelt, Yi & James LLP

(57) ABSTRACT

A system is disclosed to build and store a data model and queries for a graph database. In various embodiments, data defining one or more aspects of a data model associated with a graph database is received. A set of data that represents the data model is stored as a graph that includes one or more nodes to represent each of the following: data model metadata, one or more node labels comprising the graph database, one or more relationship types of the graph database, and one or more property definitions each associated with a property of at least one of a node label and a relationship type of the graph database.

20 Claims, 15 Drawing Sheets

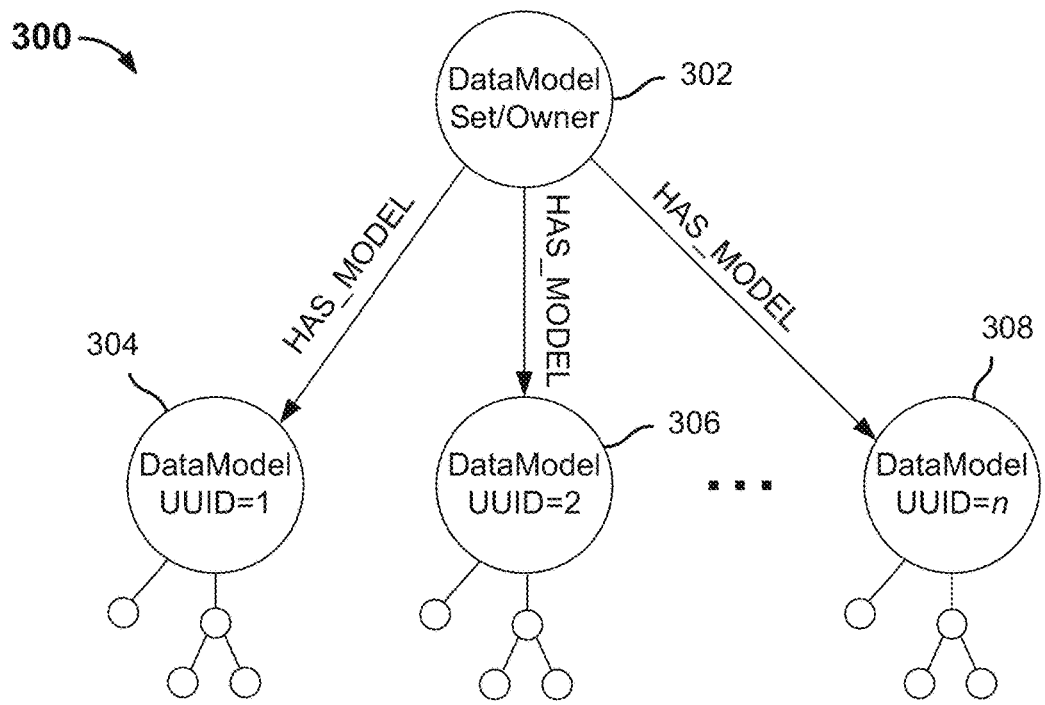
FIG. 3A
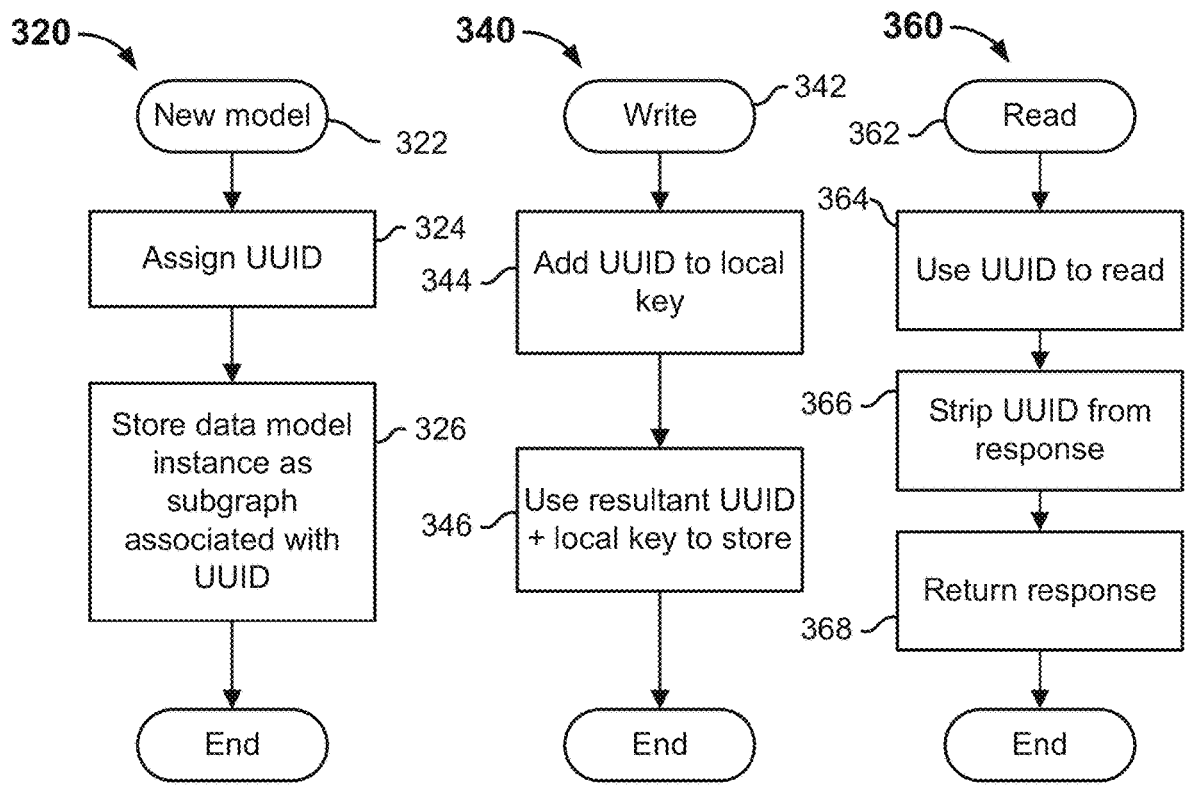
FIG. 3B
FIG. 3C
FIG. 3D

TOOL TO BUILD AND STORE A DATA MODEL AND QUERIES FOR A GRAPH DATABASE

BACKGROUND OF THE INVENTION

A graph database differs from relational databases, document databases, columnar databases, and other types of databases. A property graph database, such as Neo4j™, differs from databases that store semantic web style data such as RDF or OWL. In property graph databases, relationships are explicitly stored in on-disk data structures, as opposed to traditional relational databases that create relationships during query time. A property graph database also differs from semantic web style data storage because properties that describe nodes and relationships are stored co-located with the node and not nodes themselves.

Data may be imported into a property graph database from another database or other data source. To import data to a property graph database, node instance and relationship data must be determined and encoded. To access data, graph patterns usable to select data, e.g., using Cypher™ statements or another graph query language, must be defined.

BRIEF DESCRIPTION OF THE DRAWINGS

Various embodiments of the invention are disclosed in the following detailed description and the accompanying drawings.

FIG. 3A is a diagram illustrating an example of storing a plurality of data models each as a subgraph in an embodiment of a graph database system.

FIG. 3B is a flow diagram illustrating an embodiment of a process to store a data model as a subgraph.

FIG. 3C is a flow diagram illustrating an embodiment of a process to update a data model stored as a subgraph.

FIG. 3D is a flow diagram illustrating an embodiment of a process to read data comprising a data model stored as a subgraph.

DETAILED DESCRIPTION

Figure 1A:
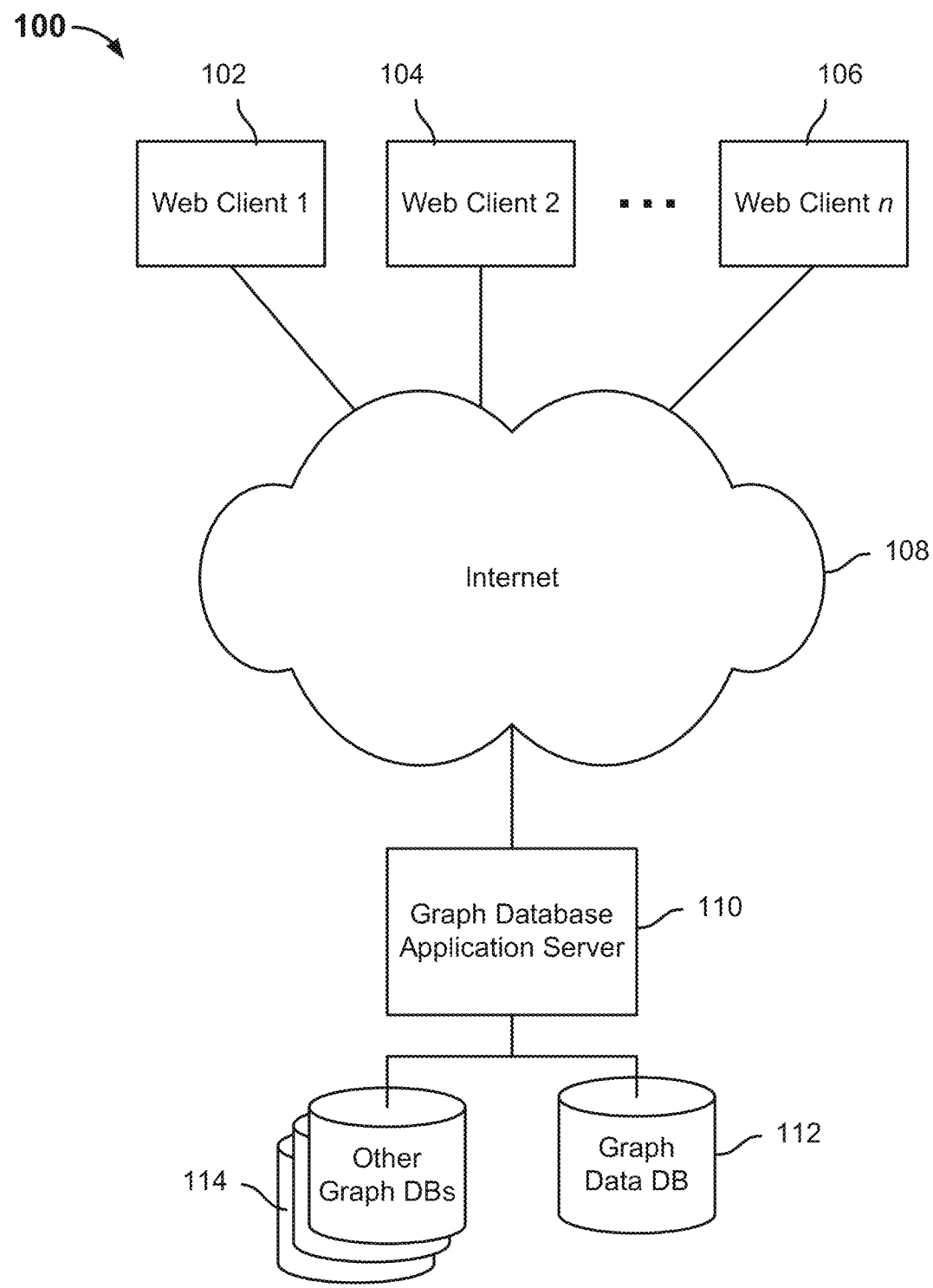
FIG. 1A is a block diagram illustrating an embodiment of a graph database system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A visual tool to assist users in creating and maintaining a property graph database is disclosed. In various embodiments, tools to perform data modeling and visual query statement building are provided. In various embodiments, additional tools are provided that capture the interconnections between logically separate task areas, such as capturing business scenarios and their interconnections to data models and queries, enabling change management and governance of solutions built using property graph databases. A tool to develop a conceptual model is provided. In various embodiments, the tool uses a data model defined by and/or inferred from a source database. The conceptual model is encoded as a logical model. The database model is represented and stored as a graph, e.g., in the property graph database system. In some embodiments, multiple data models for each of a plurality of data model owners (or other groups of data model) may be stored together, e.g., as subgraphs, in a single instance of a property graph database. Access may be controlled and provided to each subgraph based on a user's role/privileges or other connection (or not) to the subgraph.

In various embodiments, one or more of the following are provided:
Data Modeling
  Capture data model constraints
  Provide an easy to use property graph specific modeling tool
  Iterative modeling and implementation lifecycle
  Enable introspection of existing databases and queries
  Provide data model education, collaboration, and reuse
Visual Query Statement Building
  Provide a visual way to create Path Patterns, utilizing a data model if provided
  Provide button click and drop-down driven creation of other query keyword clauses
  Provide proper variable scoping support
  Get real-time feedback on query statements
Other tools
  Business Scenario capture tool
  Database data validation
  Data science modeling
  Volumetric and Architecture tool
  Data governance and lineage tool
  Data model instance and data generator tool
  Model comparison tool
  Relational model import tool and mapping relational model to graph model In various embodiments, a system as disclosed herein includes one or more of the following:
  Data model storage mirrors property graph structure and terminology
  Multiple data model storage as subgraphs
  Data model canvas auto-save based on changed nodes
  Data model canvas off-line mode
  Ability to build graph data models collaboratively over the internet
  Security features to firewall graph data models to only members of a particular organization (multi-tenant architecture)
  Data model query statement reverse engineering
  Generalized subgraph operations utilizing embedded subgraph root node schemas
  Data model driven visual methods for building query statement patterns
  Pattern usage in context of data model
  Query statement representation as a graph In the description herein, the following terms may be used and in various embodiments have the meaning indicated:
a. Entity—a term that refers to a thing.
b. Graph—a data structure that contains nodes and relationships, whereby nodes may have 0 or more relationships connecting themselves to other nodes.
c. Node—a unit of a graph typically used to represent an entity. Nodes may have 0 or more relationships to other nodes. In academic vernacular, also called a vertex.
d. Relationship—a unit of a graph that connects to two nodes together. Relationships may be directed or undirected. Directed relationships point from a source node to an end node. In academic vernacular, a relationship is also called an edge. Sometimes also called a link.
e. Graph Database—a database used to store graphs.
f. Property—a key/value pair that can be assigned to a node or relationship.
g. Property Graph—a graph where both the nodes and relationships may have 0 or more assigned properties, where the storage of the properties is co-located with the node or relationship.
h. Type—An abstract term used to describe categories of entities, or entities that share common properties. For example, a Person may be a type.
i. Instance—the data that makes up a single unit of a type. For example, a person named Bob may be an instance of type Person. A Domain Data Model when stored is an instance of the Metamodel (defined later). Likewise, nodes and relationships which conform to Node Labels and Relationship Types are instances of those types.
j. Node Label (descriptive)—data used to annotate a node to indicate which type it has.
k. Relationship Type (descriptive)—data used to annotate a relationship to indicate which type it has.
l. Labelled Property Graph—a property graph where nodes and relationships may have labels associated with them to indicate their type.
m. Property Graph Database—a database used to store property graphs.
n. Labelled Property Graph Database—a database used to store labelled property graphs.
o. Datatype—the specific data encoding of a value. Typically, it refers to things such as Number types (float, integer, . . . ), Boolean, String, and so forth.
p. Property Definition (descriptive)—the name of a property key and its associated datatype. Sometimes includes additional information that indicate constraints such as uniqueness, must exist, whether it is indexed, and so forth. For example, 'name' may be a key which stores a value of datatype String.
q. Data Model (descriptive)—a set of Node Labels, Relationship Types, and Property Definitions describing a domain of interest. Node Labels and Relationship Types may be related to 0 or more Property Definitions, and Relationship Types may relate two Node Labels together.
r. Metamodel—A data model used to describe data models. In this document, it refers to the data model used by the Application Server Graph DB to store other data models as a property graph.
s. Domain Data Model—A data model that describes a business problem or business domain as a property graph. The Domain Data Model consists of descriptive Node Labels, Relationship Types, and Property Definitions. The storage structure of the Domain Data Model is described by the Metamodel.
t. NodeLabel (Metamodel)—The Node Label the Metamodel uses to store Domain Data Model Node Labels.
u. Relationship Type (Metamodel)—The Node Label the Metamodel uses to store Domain Data Model Relationship Types.
v. PropertyDefinition (Metamodel)—The Node Label the Metamodel uses to store Domain Data Model Property Definitions.
w. DataModel (Metamodel)—The Node Label the Metamodel uses to store the root node of the Domain Data Model subgraph.
x. Root node—a node of a subgraph that is used as the starting point for fetching all related nodes of the subgraph.
y. Schema—information describing the physical structure of the data. In this document, a Data Model is used to describe a schema.
z. Graph Document—defined within the body of the text. In short, it contains a root node containing embedded schema information, enabling fetching of a subgraph with a single query, while enabling updates at an individual node, relationship, or property level.
aa. Query Statement—text using a defined syntax that enables creating, updating, reading, and processing graph data.
bb. Cypher—a specific query statement syntax that utilizes text-based patterns and various graph processing constructs.
cc. Pattern—the specification of matching criteria used to match nodes, relationships, and properties in a graph.
dd. Local—refers to processing or storage happening on the user's local machine. For instance, if the user is using a web browser on a laptop or tablet, the local machine would be the laptop or tablet, and any processing/storage performed would be local.
ee. Remote—refers to processing or storage happening on a machine accessible via a network that is not the user's local machine.
ff. Cloud—refers to processing or storage happening on machines accessible via the public internet.

FIG. 1A is a block diagram illustrating an embodiment of a graph database system. In the example shown, the system 100 includes a plurality of client systems 1 to n, represented in FIG. 1A by web clients 102, 104, and 106. The client systems, e.g., 102, 104, and 106, are connected via the Internet 108 to a graph database application server 110. Graph database application server 110 is connected to a backend graph data database 112.

In various embodiments, graph data database 112 comprises a property graph database, such as Neo4j™. Graph database application server 110 is configured to store in graph data database 112 graph database definition and/or other metadata, as disclosed herein. For example, in various embodiments, graph database application server 110 stores in application server graph data database 112 one or more graphs and/or subgraphs each representing data models. These data models may have no direct association with other graph database, as in the case of data models being conceptualized or formed before a prospective graph database is built. However, for existing graph databases 114, in some embodiments a reverse engineering process extracts their existing data model information and imports it into application server graph data database 112. In FIG. 1A the other graph databases 114 are shown to be local to graph database application server 110, but in various embodiments one or more of the other graph databases 114 may be located remote from graph database application server 110. For such remote other graph databases 114, graph database application server 110 may use graph database connection data stored in graph data database 112 to access the graph databases 114. The graph database connection data may be provided and/or defined by one or more of the clients, such as 102, 104, and 106, e.g., using a graphical or other user interface displayed at the client.

In various embodiments, users (e.g., data owners, administrators, or authorized users) associated with client systems, such as clients 102, 104, and 106, use a graph database workbench or other tool as disclosed herein to do one or more of the following:

Define a connection to a graph database, e.g., one store in one of the graph databases 114;
Define, refine, and/or update a data model for a graph database;
Define, refine, and/or update one or more node and/or relationship patterns associated with a graph database; and
Build and/or validate one or more query statements usable to retrieve data from a graph database.

Figure 1B:
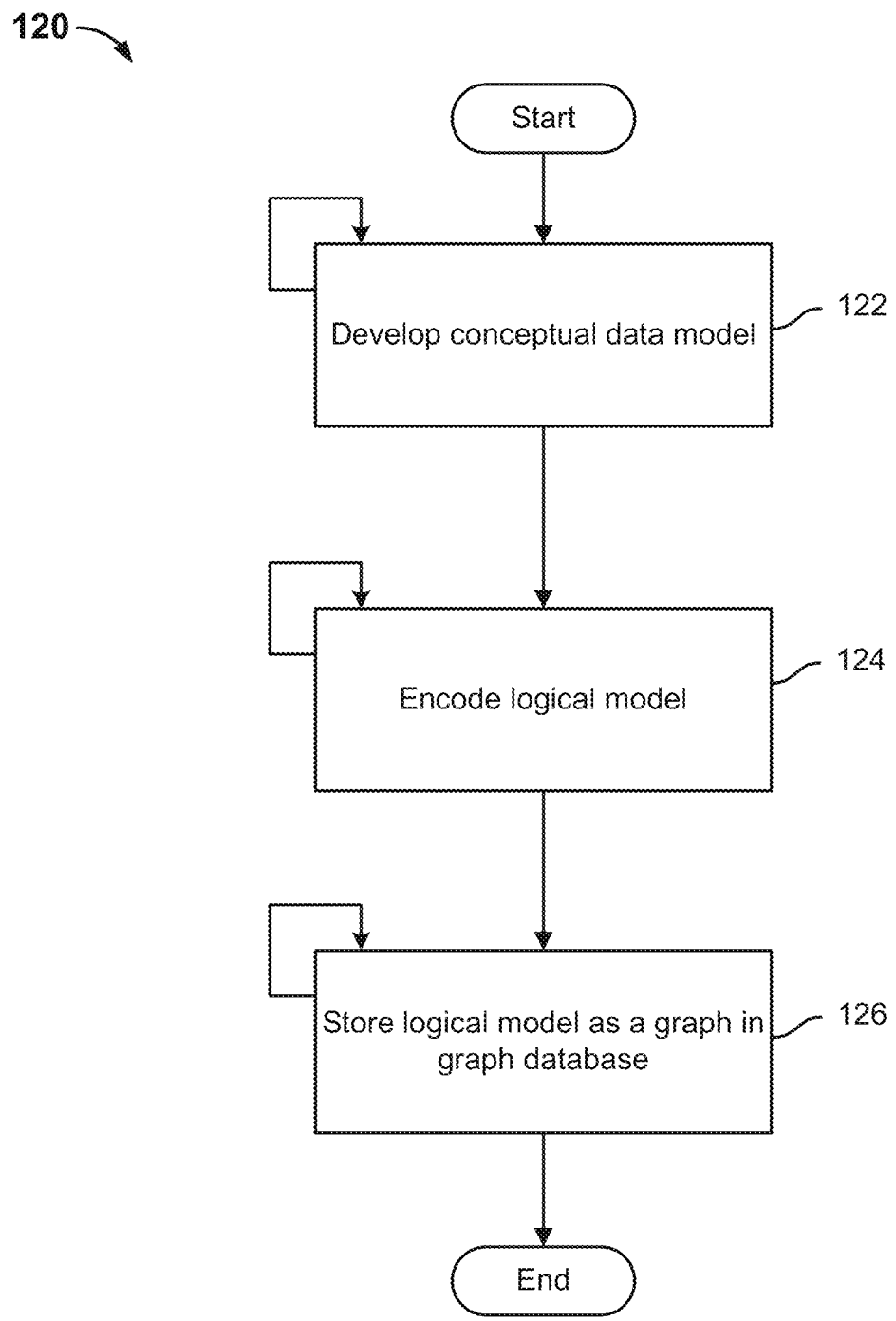
FIG. 1B is a flow diagram illustrating an embodiment of a process to create and store a data model.

FIG. 1B is a flow diagram illustrating an embodiment of a process to create and store a data model. In various embodiments, the process 120 of FIG. 1B is performed by a graph database application server, such as graph database application server 110 of FIG. 1A. In the example shown, at 122 a conceptual data model is developed. For example, a user of a client system, such as clients 102, 104, and 106 of FIG. 1A, may use a graphical user interface associated with a graph database workbench tool as disclosed herein to connect a graph database to the graph database workbench tool and/or graph database application server; and to access, generate, and/or refine data model information for the graph database. In various embodiments, the conceptual model developed at 122 captures entities (e.g., node labels) and relationships in an informal manner At 124, the conceptual data model developed and/or refined or updated at 122 is used to encode a logical model of the graph database. In various embodiments, the logical model captures entities and relationships in a formal manner, capturing as much detail as possible. The logical model includes information that controls how data is physically stored, including one or more of data typing, definition of primary keys, which fields are indexed, etc. At 126, the logical model is stored as a graph or subgraph in a graph database, such as graph data database 112 of FIG. 1A.

In the example shown, each of steps 122, 124, and 126 is shown to be repeated, as necessary, e.g., to reflect updates to the data model. For example, a user may interact further with a data model definition tool as disclosed herein, e.g., to add or update entities (e.g., node labels, relationship types, etc.). Such changes in a subsequent iteration of step 122 may be used to update a corresponding logical model in a subsequent iteration of step 124, which would then result in the data model graph being updated in a further iteration of step 126, for example.

Figure 2:
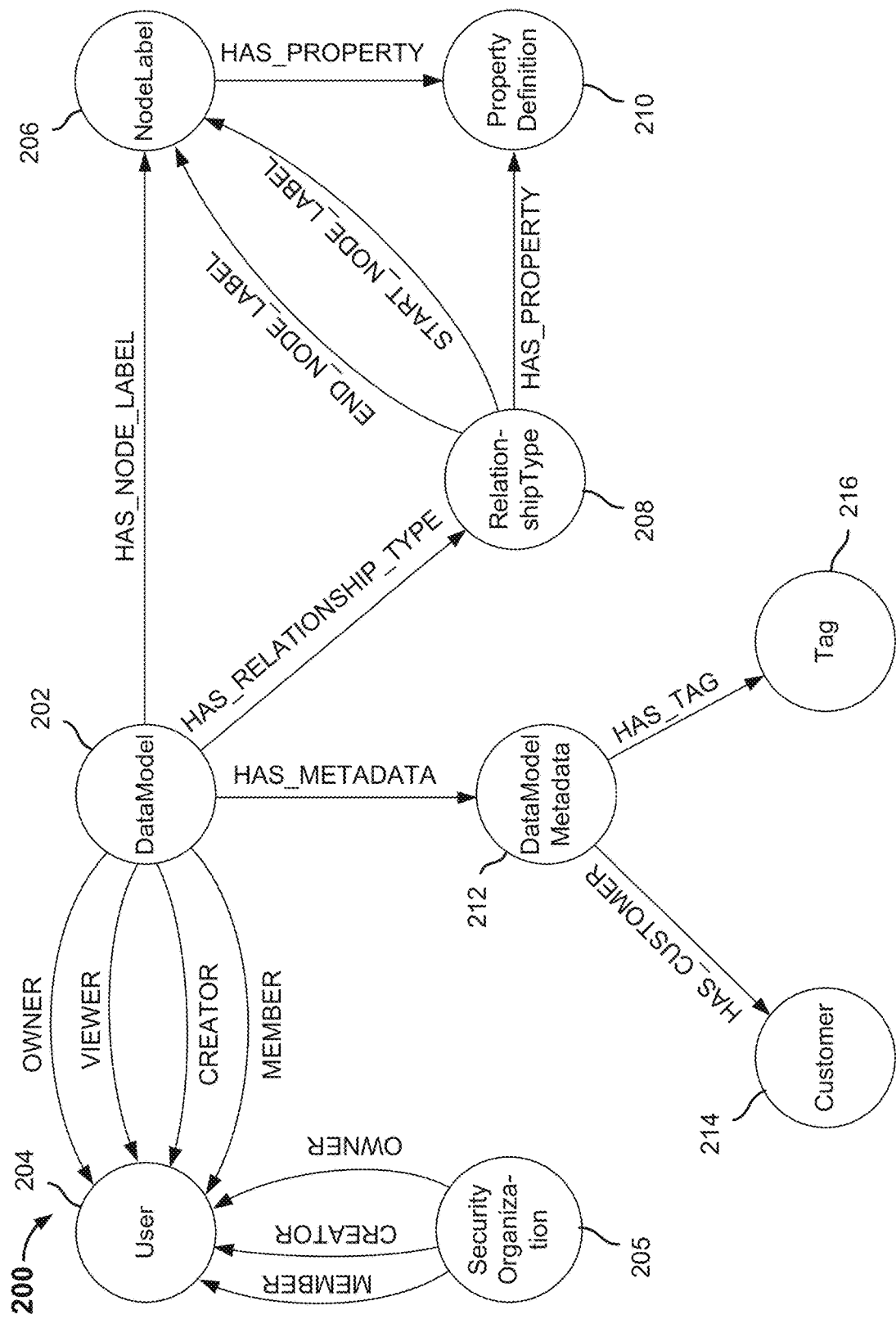
FIG. 2 is a diagram illustrating an example of storing a data model as a graph in an embodiment of a graph database system.

FIG. 2 is a diagram illustrating an example of storing a data model as a graph in an embodiment of a graph database system. In various embodiments, the graph 200 may be stored by a graph database application server, such as server 110 of FIG. 1A, in a graph database, such as graph data database 112 of FIG. 1A. In the example shown, graph 200 includes the following types: Data Model 202, Data Model Metadata 212, Node Label 206, Relationship Type 208, and Property Definition 210. "Data Model" refers to a data model or schema, in various embodiments. In various embodiments, Data Model Metadata 212 describes information about the data model represented by Data Model 202, such as a title, description, and tags. In various embodiments, Property Definition 210 enables a data type and/or additional information about a property to be specified.

The graph 200 includes an instance of a Node Label called NodeLabel 206, and an instance of a Node Label called RelationshipType 208. They are related to each other by Relationship Type instances START_NODE_LABEL and END_NODE_LABEL, usable to define and store an identification of the Node Labels on the start and end sides of a relationship of a given Relationship Type, in various embodiments. Every Relationship Type is also stored as a node with the label RelationshipType 208.

As an example, in various embodiments a system as disclosed herein may be used to store information about people that have acted in a movie and for each their role. To store instances of people, a Node Label called "Person" may be defined. To store instances of movies a Node Label called "Movie" may be defined. To relate Person and Movie, the Relationship Type ACTED_IN may be defined. A simple Cypher™ snippet of this model would look like (:Person {name:'<string>'})-[:ACTED_IN {role:'<string>'}]→(:Movie {title:'<string>'}), where name, role, and title are the allowed property keys associated with Person, ACTED_IN, and Movie, respectively. The property key along with the property data type would be captured as a PropertyDefinition. For example, information about a specific person and movie, e.g., an actor named "Bob" acted in a movie titled "Big Movie" as role "Dan", may be stored in a property graph database as follows—there would be a node instance having the Node Label Person and property name='Bob', and another node instance having the Node Label Movie and property title='Big Movie'. The two node instances would be connected by a relationship having the Relationship Type ACTED_IN with a property role='Dan'. In Cypher™ this looks like (:Person {name:'Bob'}-[:ACTED_IN {role:'Dan'}]→(:Movie {title:'Big Movie'}).

In various embodiments, a system as disclosed herein stores in a graph database a graph comprising metadata that defines and represents the data model described above. For example, in various embodiments, the actual model information, i.e., Person, Movie, ACTED_IN, name, role, and title in the example above, are represented and stored in a graph. For example, "Person" may be stored as an instance of NodeLabel, where 'NodeLabel' is the actual value of the Node Label. A simple Cypher™ snippet of a data model to store the data model would be (:NodeLabel)-[:RELATIONSHIP_TYPE]→(:NodeLabel). However, in this form it is difficult to associate PropertyDefinitions such as name, title, and role. Therefore, a more suitable format is used in various embodiments, which looks like this: (:NodeLabel)-[:HAS_PROPERTY]→(:PropertyDefinition), (:RelationshipType)-[:HAS_PROPERTY]→(:PropertyDefinition). In order to relate two NodeLabels together, the expressions (:RelationshipType)-[:START_NODE_LABEL]→(:NodeLabel), and (:RelationshipType)-[:END_NODE_LABEL]→(:NodeLabel) are used in various embodiments. Taken together they capture the same information as (:NodeLabel)-[:RELATIONSHIP_TYPE]→(:NodeLabel), where the :NodeLabel to the left of :RELATIONSHIP_TYPE is the :NodeLabel pointed to by :START_NODE_LABEL, and the :NodeLabel to the right of :RELATIONSHIP_TYPE is the :NodeLabel pointed to by :END_NODE_LABEL. In various embodiments, using RelationshipType as a Node Label, allows PropertyDefinitions to be associated with a Relationship Type, as in the example shown in graph 200. Given this data model structure, the Person/Movie data model described above can be stored as an instance of this data model. In Cypher™ this would look like: (:NodeLabel {label:'Person'})-[:HAS_PROPERTY]-→(:PropertyDefinition {name:'name', datatype:'String'}), (:NodeLabel {label:'Movie'})-[:HAS_PROPERTY]→(:PropertyDefinition {name:'title', datatype:'String'}), (:RelationshipType {type:'ACTED_IN'})-[:HAS_PROPERTY]→(:PropertyDefinition {name:'role', datatype:'String'}), (:RelationshipType {type:'ACTED_IN'})-[:START_NODE_LABEL]→(:NodeLabel {label:'Person'}), (:RelationshipType {type:'ACTED_IN'})-[:END_NODE_LABEL]→(:NodeLabel {label:'Movie'}).

In addition to the entities describe above, graph 200 includes a Node Label called User 104, each instance of which represents a user associated with the data model represented by an instance of graph 200, e.g., one or more users of client systems, such as clients 102, 104, and 106 of FIG. 1A. As defined in graph 200, a User 204 may have an Owner, Viewer, Creator, and/or Member to a given data model represented by an instance of DataModel 202.

In the example shown in FIG. 2, in addition to User 204, graph 200 includes a Node Label called SecurityOrganization 205. In various embodiments, SecurityOrganizations 205 enable users, data models, and graph documents (described below) to be stored in the same database while maintaining security and/or privacy between different organizations. Each SecurityOrganization 205 has a name. In some embodiments, the name of the SecurityOrganization 205 is used as an additional Node Label on every node stored in the graph database and is used to enforce security/privacy between different organizations. Each User 204 can belong to more than one SecurityOrganization 205, and a SecurityOrganization 205 can have many users. However, only one SecurityOrganization 205 can be active at a given time for a specific User 204, in some embodiments. This is indicated, in some embodiments, by a property on the User's node 204 called primaryOrganization. The value of primaryOrganization is appended as an additional Node Label to each node stored in the graph database as the result of a user action. Additionally, it is added as extra filter criteria to every query where nodes are fetched. For example, consider a User 'Bob' with email=bob@acme.com, and a SecurityOrganization called 'Acme', and Acme is Bob's primaryOrganization. A simple Cypher snippet for this would be (Bob:User {email:'bob@acme.com', primaryOrganization:'Acme'})-[:MEMBER]→(:SecurityOrganization {name:'Acme'}), where Bob is a variable we will use to refer to the user. If Bob had stored our Person/Movie model from earlier, when writing any of the nodes, an additional Node Label 'Acme' would have been added. Looking just at Person/name from the previous model, our Cypher would now look like (:NodeLabel:Acme {label:'Person'})-[:HAS_PROPERTY]→(:PropertyDefinition:Acme {name:'name', datatype:'String'}). There are now two Node Labels, 'Node Label' and 'Acme' for Person, and two Node Labels 'PropertyDefinition' and 'Acme' for name. The rationale for this scheme is two-fold—(1) even though data models and graph documents are stored as subgraphs loaded via their root nodes, there are operations such as searching via title, description, tag and so forth which search across the entire database. Adding SecurityOrganization tags enables information from other SecurityOrgniazations to be filtered out, and (2) it provides an additional layer of data isolation to ensure security/privacy.

Finally, in the example shown in FIG. 2, the data model metadata represented by DataModel Metadata 212 may have a relationship to a customer represented by Customer 214 and a tag represented by and stored in Tag 216. The Tag 216 enables multiple node instance of Node Label Tag to be associated to the DataModel Metadata 212. Tags 216 provide the users a way to provide descriptive information to help categorize and locate models. The Customer 214 works similar to Tags, but its intention is to only capture customer names and organizations, as opposed to the more general purpose tag.

FIG. 3A is a diagram illustrating an example of storing a plurality of data models each as a subgraph in an embodiment of a graph database system. In the example shown, the graph 300 represents a data model owner (e.g., customer, enterprise, user) 302 as a root node and each of a plurality of data model instances 1 to n, represented in FIG. 3A by data models 304, 306, and 308, being stored as a subgraph of graph 300. Each of the subgraphs, e.g., 304, 306, and 308 in this example, maybe comprise an instance of a data model represented by a graph such as graph 200 of FIG. 2. In this manner, many data models may be stored in the same graph database, with each data model being stored as a subgraph.

In typical prior solutions, storing multiple data models typically involves document-based storage, such as storing JSON documents. Models can be stored as a subgraph in prior systems, but typically this is done only for a single model to perform some sort of function, like validating the current database against the model.

In the approach disclosed herein, multiple data models are stored as subgraphs, which exposes the data contained within those data models to discovery and retrieval using a graph query language, such as Cypher™. In various embodiments, the following requirements are met:

Avoid node collisions between multiple models
Separation of models from one another
Enable offline mode data to be written when back online In a document-based approach, a single file typically stores all of the data related to the data model. This document serves as a unit and can be read and updated without affecting other documents, so if a new node label is added to the document, it has no effect on other documents. The document will have a unique identifier which separates it from other documents. Offline documents can be updated locally and then stored as a unit when back online.

In a graph used to store multiple data models each as a subgraph, as disclosed herein, all data belongs to a single graph. Separation in a graph, such as graph 300, is maintained in various embodiments via the relationships between nodes. If a set of nodes has no relationships to another set of nodes, then even though they are still in the same graph, they can be fetched as a subgraph using a specific Cypher™ or other query. For example, the subgraphs associated with nodes 304, 306, and 308 in the example shown in FIG. 3A can each be fetched as a subgraph using a single, specific Cypher™ or other query.

In various embodiments, the nodes that make up a data model are all stored in the single global graph, and each node has a global unique identifier. In an offline mode, however, there is no way to ask the database for unique identifiers, which presents a problem when trying to synchronize offline and online data.

In various embodiments, a system as disclosed herein solves this problem by performing one or more of the following steps:

Creating a local Universally Unique Identifier (UUID) when creating a new data model. The UUID can be used as a unique identifier when a node with the DataModel label is stored in the graph database.

Using the DataModel node as a central linking node to link other data model information together, such as nodes with the NodeLabel and RelationshipType node labels.

For new Node Labels and Relationship Types that make up a data model, assigning their keys locally.

When stored, prefixing all local keys with the data model UUID, to create unique identifiers for all nodes to be stored in the Neo4j database.

When retrieved, stripping off the UUID prefix so the model can be worked on locally, new local keys can be generated, and the new model can be exported without the UUID.

In various embodiments, performing the above techniques enables the data model to be stored as a subgraph comprising nodes and relationships while enabling the data model to be retrieved as a document by referring to the DataModel UUID with a specific query pattern. In various embodiments, the UUID is added, transparently to the user, as prefixes to entities in Cypher™ or other queries to make it look like the data models are separate to all users using the system, even though in the database they are stored in a single global graph.

FIG. 3B is a flow diagram illustrating an embodiment of a process to store a data model as a subgraph. In various embodiments, the process 320 is performed by a graph database application server, such as server 110 of FIG. 1A. In various embodiments, the process 320 is performed in connection with adding a data model as a subgraph to a single global graph, such as graph 300 of FIG. 3A. In example shown, when a new model is added to the graph at 322, a UUID is assigned at 324. At 326, the data model is stored as a subgraph associated with the UUID.

FIG. 3C is a flow diagram illustrating an embodiment of a process to update a data model stored as a subgraph. In various embodiments, the process 340 is performed by a graph database application server, such as server 110 of FIG. 1A. In various embodiments, the process 340 is performed in connection with writing data to a data model stored as a subgraph to a single global graph, such as graph 300 of FIG. 3A. In example shown, upon receiving at 342 a write to a data model stored as a subgraph, e.g., an addition to or modification of data associated with one or more entities comprising the subgraph, at 344 the UUID of the data model instance is determined and added to one or more entity labels to ensure the labels match the corresponding keys of those entities as stored in the global graph. At 346, the modified entity label(s) (i.e., key(s)) is/are used to write the data to the correct subgraph. For example, in the example shown in FIG. 3A, a write to a node labeled "DataModel Metadata" in a data model stored in graph 300 as a subgraph associated with DataModel node 304 may have the UUID associated with that node 304, which is the value "1" in this example, prepended to one or more entity labels (or other keywords) in the query statement associated with the write, to ensure the correct instance of the DataModel Metadata type node is updated.

In various embodiments, the UUID to be added to one or more entity labels or other keywords at 344 may be determined based at least in part on a context data associated with the write received at 342. For example, a client system and/or user with which the write received at 342 is associated may be used to look up the corresponding UUID for the data model being updated.

FIG. 3D is a flow diagram illustrating an embodiment of a process to read data comprising a data model stored as a subgraph. In various embodiments, the process 360 is performed by a graph database application server, such as server 110 of FIG. 1A. In various embodiments, the process 360 is performed in connection with reading data comprising a data model stored as a subgraph to a single global graph, such as graph 300 of FIG. 3A. In example shown, upon receiving a read request at 362, a UUID of a data model with which the request is associated is used at 364 to be used to read the requested data. For example, the UUID may be looked up based at least in part on the user from which the read request was received at 362. The UUID is prepended (or otherwise added) to one or more entities and/or other keywords comprising the read request received at 362 and the modified query statement is processed to retrieve the requested data from the subgraph corresponding to the UUID.

At 366, the UUID is stripped from entity labels and/or other data comprising the data retrieved at 364. At 368, a response is returned using the data retrieved at 364 minus the UUID data stripped at 366. In this way, the end user (e.g., client system) sees only the entity labels of the data model represented by the corresponding subgraph.

Figures 4A, 4B:
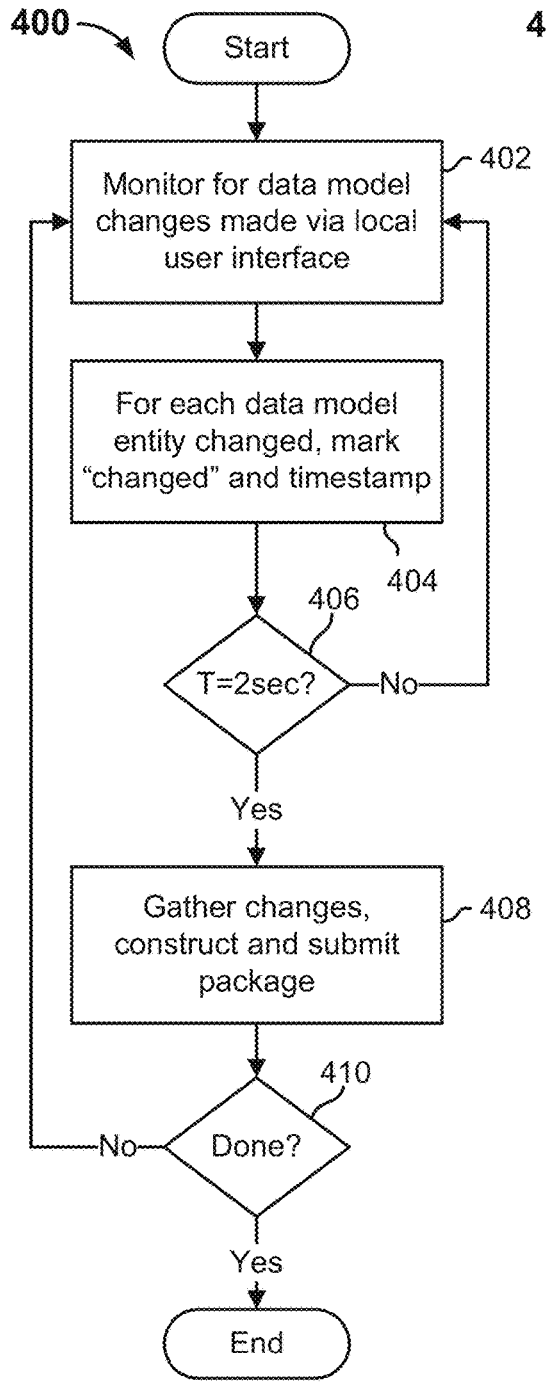
FIG. 4A is a flow diagram illustrating an embodiment of a process to auto-save updates to a data model or other graph.
FIG. 4B is a flow diagram illustrating an embodiment of a process to gather and submit changes in connection with an auto-save of updates to a data model or other graph.

FIG. 4A is a flow diagram illustrating an embodiment of a process to auto-save updates to a data model or other graph. In various embodiments, the process 400 of FIG. 4A is performed by a client system, such as clients 102, 104, and 106 in the example shown in FIG. 1A. In various embodiments, the process 400 may be performed by client-side code running at a client system, such as a client application and/or code executed by a browser.

In various embodiments, a data model definition tool as disclosed herein provides a graphical user interface to define and/or update a data model. As changes are made, e.g., at a client system, in various embodiments an auto-save is performed as disclosed herein. In various embodiments, the auto-save is performed as follows:

- Changes to the data model are marked as changed and are time stamped when a user changes an item
- At periodic intervals (e.g., every 2 seconds), a timer is invoked that initiates the rest of the below steps
- A save timestamp is captured
- All items marked as changed are retrieved
- All items marked as changed have their local key identifier switched to the global key identifier, e.g., UUID added, as discussed above
- A JSON payload is constructed that contains only the changed items
- A GraphQL endpoint is called to save the changes
  - The GraphQL endpoint unpacks the JSON payload and applies those specific changes to the graph
  - The change packet can create nodes, delete nodes, create relationships, delete relationships, add or update node properties, remove node properties, add or update relationship properties, and remove relationship properties
- Upon success, the saved timestamp is compared with the last changed timestamp of each item as follows:
  - If the time last changed is earlier than the saved timestamp, then the change flag of the item is removed (i.e., set to "not changed" since last save). As such it will not be part of the next save cycle unless it is changed again.
  - If time last changed is later than or the same as the saved timestamp, then the change flag is not reset. Therefore, any items changed while the GraphQL call was pending (or later) remain marked to be saved on the next save cycle.
- Upon Network error failure, a recovery process involving local storage is invoked.

Referring to the example shown in FIG. 4A, at 402 the system monitors for data model changes made via the local (e.g., client side) user interface. At 404, for each data model entity that is changed (e.g., added, modified) locally, the item is marked as having been changed, e.g., by setting a "changed" flag and an associated changed timestamp is saved and/or updated. Periodically, e.g., every 2 seconds in this example (406), at 408 changes are gathered and a JSON or other package of changes is constructed and submitted. For example, the package may be sent from a client system, such as clients 102, 104, 106 of FIG. 1A to a remote graph database application server, such as server 110 of FIG. 1A.

In various embodiments, the server is configured to update the corresponding data in the graph database, such as one or more nodes and relationships in a subgraph representing a data model or other subgraph with which the changes are associated, such as subgraphs 304, 306, and 308 of FIG. 3A. In various embodiments, the changes are processed according to the process of FIG. 3C.

Upon success, the "changed" flag for items update via the package are reset. Change tracking (402, 404) and periodic auto-saves (406, 408) continue until the process 400 ends (410), e.g., the application/web session is terminated at the client system.

FIG. 4B is a flow diagram illustrating an embodiment of a process to gather and submit changes in connection with an auto-save of updates to a data model or other graph. In various embodiments, the process 400 of FIG. 4A is performed by a client system, such as clients 102, 104, and 106 in the example shown in FIG. 1A, e.g., to implement step 408 of FIG. 4A. In the example shown, at 422 a "saved" timestamp is captured. The saved timestamp identifies the start time of the process of FIG. 4B (e.g., step 408 of process 400 of FIG. 4A) and is used as disclosed herein to ensure that changes made subsequent to the "saved" timestamp are captured and saved in a later iteration of the processes of FIGS. 4A and 4B.

At 424, all items (e.g., entities) marked as "changed" are retrieved. In various embodiments, for each item a "changed" flag such as one set in an iteration of step 404 of FIG. 4A is checked at 424, and for each item for which the flag is set to a value indicating it has been changed since it was last saved the item is included in the set of changed items retrieved at 424. At 426, a JSON payload that includes only the changed items (e.g., nodes) is constructed. At 428, a GraphQL endpoint is called to save the changes, e.g., by sending the JSON payload to the endpoint. If a response is received indicating the updates were saved successfully (430), at 432 the "saved" timestamp is used to reset the "changed" flag for any item for which the "changed" flag is set to a value indicating the item has been changed and the associated "changed" timestamp is earlier than the "saved" timestamp.

If the save request was not processed successfully (430), exception handling processing is performed at 434. For example, the auto-save package constructed at 426 may be resent, or the changes may be allowed to be included in the next auto-save set constructed in the next iteration of the process 400 of FIG. 4A.

Figure 5A:
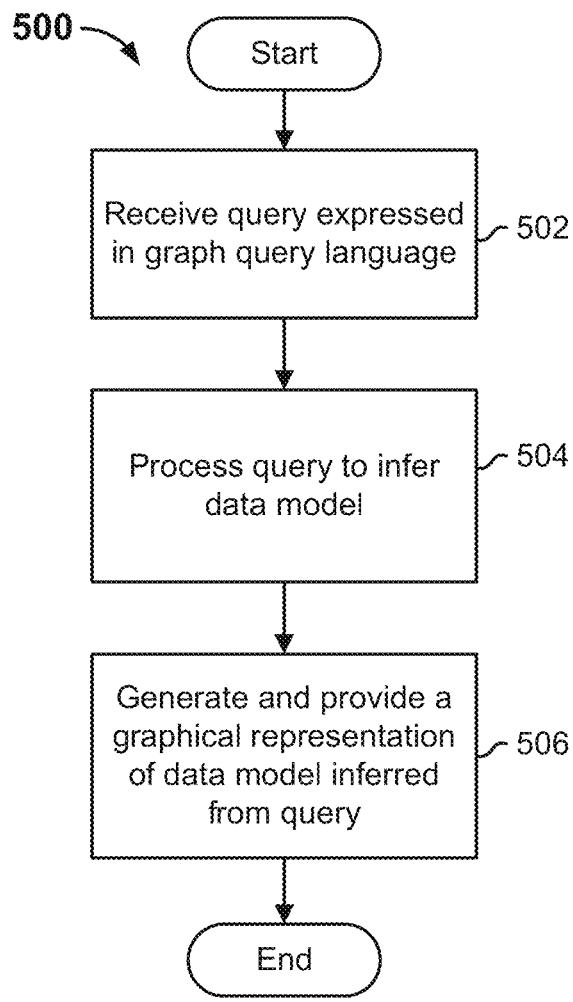
FIG. 5A is a flow diagram illustrating an embodiment of a process to infer a data model or portion thereof based on a received query statement.

FIG. 5A is a flow diagram illustrating an embodiment of a process to infer a data model or portion thereof based on a received query statement.

In various embodiments, the process 500 of FIG. 5A is performed in whole or in part by one or both of a client system, such as clients 102, 104, and 106 of FIG. 1A and a graph database application server, such as server 110 of FIG. 1A. In various embodiments, the process 500 is performed by a module, e.g., software code, comprising a data model definition or other tool. For example, in various embodiments, the process 500 is performed to derive a data model and/or a portion thereof based on a Cypher™ or other query language statement associated with the graph database for which the data model is being defined.

Referring to FIG. 5A, at 502 a query expressed in a graph query language, such as Cypher™, is received. At 504, the statement(s) is/are processed to infer an associated data model (or portion thereof). At 506, a graphical representation of the data model inferred at 504 is generated (or updated) and displayed, e.g., via a graphical user interface.

Figure 5B:
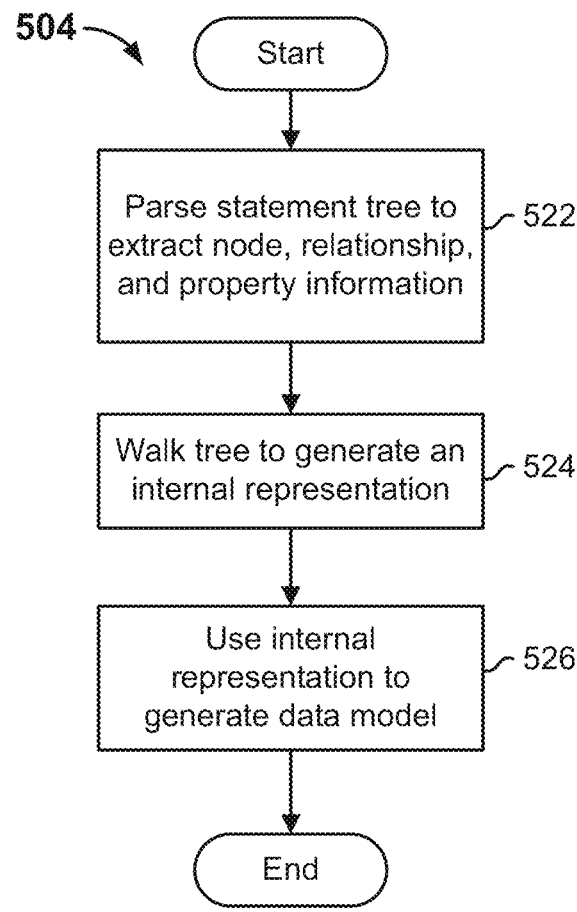
FIG. 5B is a flow diagram illustrating an embodiment of a process to process a query to infer a data model or portion thereof.

FIG. 5B is a flow diagram illustrating an embodiment of a process to process a query to infer a data model or portion thereof. In the example shown, at 522 a statement tree associated with the query statement(s) is parsed to extract node, relationship, and property information. At 524, the parsed statement tree is walked to generate an internal representation of the node, relationship, and property information. At 526, the internal representation is used to generate the data model. For example, node, relationship, and property information may be used to create and/or update instances of nodes or node labels defined in the data model. Similarly, relationship information may be used to created and/or update instances of relationship type nodes and/or other entities in the data model.

Figure 5C:
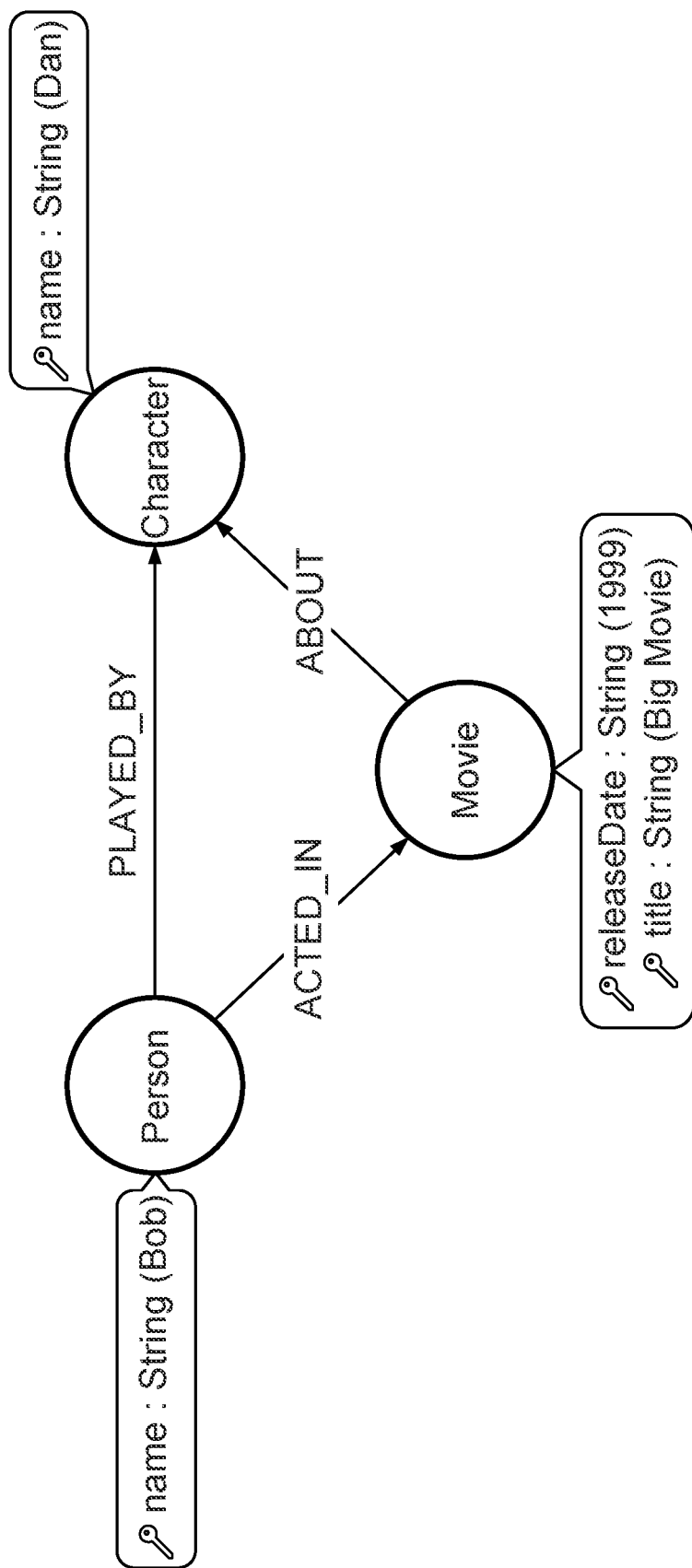
FIG. 5C is a diagram illustrating an example of a data model or portion thereof generated based at least in part on a set of one or more query statements.

FIG. 5C is a diagram illustrating an example of a data model or portion thereof generated based at least in part on a set of one or more query statements. In various embodiments, a graph database data model definition tool as disclosed herein provides for the reverse engineering of Cypher™ or other graph query language statements to obtain a data model. For example, consider the following Cypher™ statements:

```
MATCH (p:Person)-[:ACTED_IN]->(m:Movie) RETURN p, m;
MERGE (m:Movie {releaseDate: '1999', title:'Big Movie'})-
[:ABOUT]->(:Character {name: 'Dan'})<-[:PLAYED_BY]-(p:Person
{name:'Bob'});
```

In various embodiments, a set of one or more query statements, such as the above Cypher™ statements, are parsed to obtain the data model or a portion thereof. The data model for the above statements as generated in various embodiments is shown in FIG. 5C.

In the example shown in FIG. 5C, the parser extracted three unique Node Labels: Person, Character, and Movie. It extracted 3. Relationship Types: ACTED_IN, PLAYED_BY, and ABOUT. It also extracted a number of properties (e.g., name, relaseDate, title) and some example values that were present in the Cypher™ statements.

Figure 6:
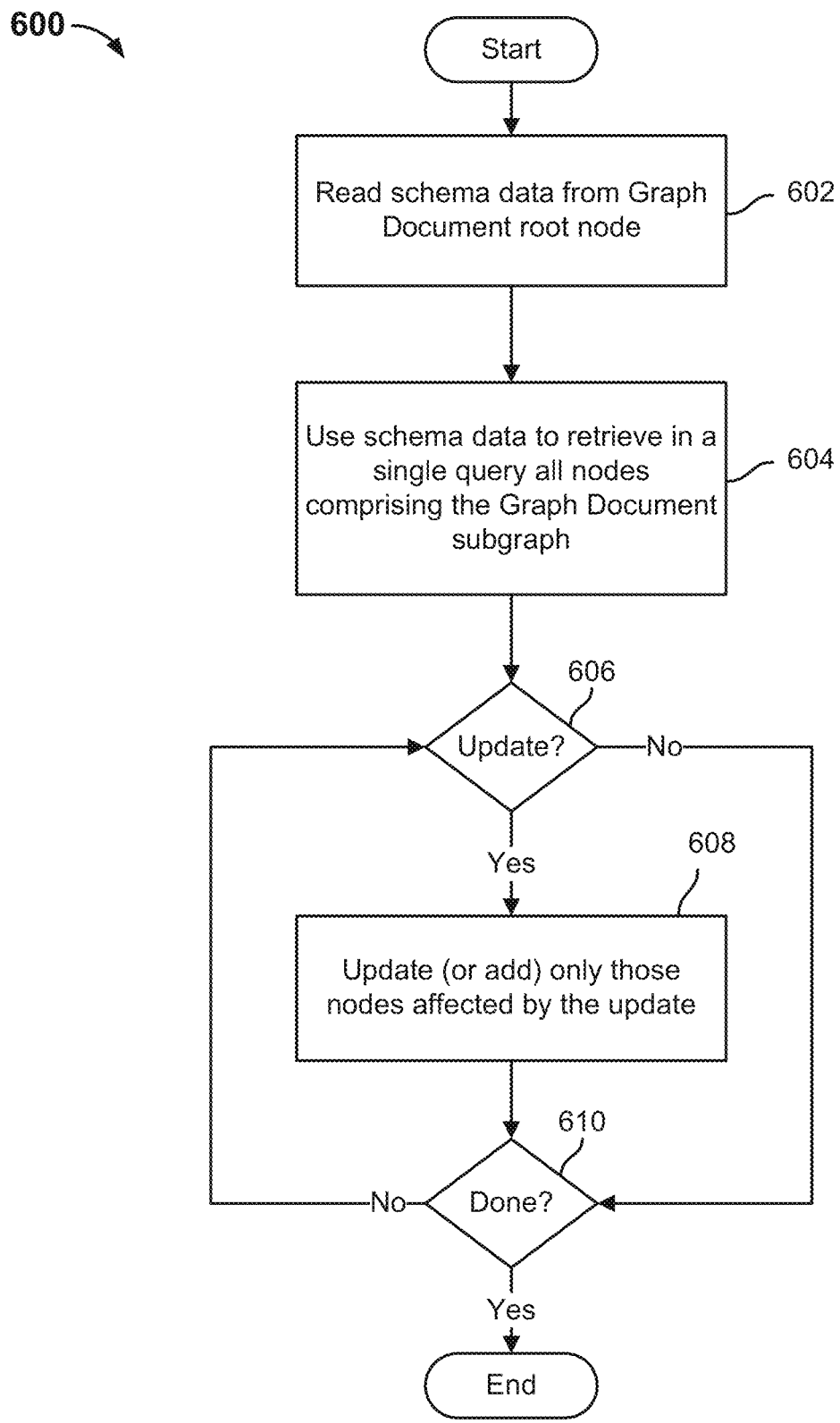
FIG. 6 is a flow diagram illustrating an embodiment of a process to retrieve and update a graph document.

In various embodiments, a system as disclosed herein performs the following steps to create a Data Model:
- Parse each Cypher™ statement using a modified Antlr grammar based on the openCypher grammars
  - Parsing involves standard Antlr techniques including lexing, parsing, and tree walking
  - A custom tree walker listener is defined which translates the Antlr parse tree into a custom representation of a Cypher™ statement
    - The custom representation overrides specific listeners corresponding with parser rules to generate the necessary internal Cypher™ statement representation
  - The internal Cypher™ statement representation is then walked again, this time to produce the data model, using custom translation rules.
    - Among these rules are back tracking of variables to find all relevant information about the Node Label or Relationship Type FIG. 6 is a flow diagram illustrating an embodiment of a process to retrieve and update a graph document. In various embodiments, the process 600 is performed by a graph database application server, such as server 110 of FIG. 1A. In various embodiments, the process 600 is used to store, retrieve, and modify documents each stored as a subgraph in a graph database. In various embodiments, a document stored as a graph and retrieved and manipulated as described in FIG. 6 is referred to as a "Graph Document". In various embodiments, a Graph Document has the following properties:

- It is a subgraph
- It has a root node
- It contains schema definitions on its root node
- Its contents can be fetched or deleted using a single query
- Additions, updates, and deletes can be performed at a node or relationship level In a typical prior approach, documents are stored as a property value on a node. One method of storing documents in a graph is to serialize the document as JSON and store the serialized JSON as a property value. When using this approach, the contents that make up the document cannot be efficiently queried using Cypher™ or another query language. Additionally, every update to the document results in the entire JSON document being sent over the network and updated in the database. The larger the document becomes, the more inefficient this process becomes. When considering many small changes to a large document, the entire JSON document must be serialized and stored, therefore creating unnecessary work. At scale, this unnecessary work may cause both database and network scalability and reliability issues. Conversely, with the Graph Document approach as disclosed herein, in various embodiments, the document is fetched once on load, then operations to the document are small and affect only the portions being edited.

Other approaches to view subgraphs as documents involve writing custom code at the application or database tier for each document type to store. The generalized approach presented here and illustrated in FIG. 6 does not involve writing custom code in the application or database tiers, in various embodiments, but instead relies only on code at the user interface level, e.g., client side user interface code, to create and interpret the Graph Documents.

This generalized approach is achieved, in various embodiments, using the following technical artifacts:
- General property graph data structure
- Subgraph root node schemas
- Definition and handling of node keys
- Definition and handling of relationship keys In various embodiments, a generalized property graph structure is used to manipulate data at the user interface/client level. The relevant data structures as implemented in some embodiments are presented as Javascript pseudo-code here:

```
Node {
    this.key = <String>;
    this.isRootNode = <Boolean>;
    this.primaryNodeLabel = <String>;
    this.labels = [<String>];
    this.properties = { }; // key is a string, value is any value
}
Relationship {
    this.key = <String>;
    this.type = <String>;
    this.startNode = <Node>;
    this.endNode = <Node>
    this.properties = { }; // key is a string, value is any value
}
GraphData {
    this.nodes = { };// key is Node.key, value is of type <Node>
    this.relationships = { }; // key is Relationship.key, value is
    of type <Relationship>
}
```

These data structures provide a way to represent and work with graph data loaded from a property graph database.

Subgraph root node schemas. The storage of schema information at the root node of a subgraph is used to satisfy the following criteria for a Graph Document:

It has a root node

Root nodes are nodes that have isRootNode=true.

It contains schema definitions on its root node

Two categories of schema information are stored at the root node.
  (1) Information to fetch all nodes of the Graph Document in a single operation
  (2) Information to construct keys for uniquely identifying nodes and relationships This information is stored as properties of the root node.

Its contents can be fetched or deleted using a single query

The property information stored at the root node contains enough information to perform a graph traversal to pick up the constituent nodes and relationships of the Graph Document, and only those nodes and relationships.

Additions, updates, and deletes can be performed at a node or relationship level The property information stored at the root node can be used to reconstruct a set of information that uniquely identifies a node or relationship, enabling updates and deletes, or allowing the subgraph to be extended.

These concepts can best be demonstrated by an example. Consider the following properties subgraphConfig_labelFilter and subgraphConfig_relationshipFilter stored as properties on the root node of a Graph document.

```
"subgraphConfig_labelFilter":
"+CypherBuilder|+CypherBlock|+CypherPattern",
"subgraphConfig_relationshipFilter":
"NEXT>|CYPHER_PATTERN>|HAS_CYPHER_BLOCK>",
```

In various embodiments, the values of the above two properties can be fed into the Cypher™ stored procedure apoc.path.subgraphAll( ) to perform a graph traversal starting from the root node. In some embodiments, it traverses any relationships outward that have a NEXT, CYPHER_PATTERN, or HAS_CYPHER_BLOCK relationship type, and examines each node to see whether it has the CypherBuilder, CypherBlock, or CypherPattern node labels.

Examples for uniquely identifying nodes and relationships will be shown in the following sections.

Definition and handling of node keys. A node key can be defined by specifying a Node Label and one or more properties. However, nodes can have multiple node labels, and they can have multiple properties. There is no distinction in a property graph database whether a specific Node Label or specific property is part of a key. So, upon inspection of a node there is no telling how it is uniquely identified versus other nodes in the database.

The method to overcome this limitation, in various embodiments, is to specify which Node Label and which properties make up the node key at the root node of the Graph Document. For example, consider these properties stored at the root node:

```
"keyConfig_CypherBlock": ["key"]
"keyConfig_CypherPattern": ["key"]
```

They are parsed to ascertain that a node with a Node Label 'CypherBlock' has the 'key' property that makes up its node key. Likewise, 'CypherPattern' also has 'key' as its only node key property.

The GraphQL pseudo-code below shows a key property containing the necessary information to uniquely identify the node. When returning data from the database, the labels and properties that make up the key can be separated into the 'key' field, such that when it is desired to update or delete the node, the node can be uniquely identified with the key.

```
Property {
    key: String
    value: Any
}
NodeKey {
    label: String
    properties: [Property]
}
Node {
    key: NodeKey
    labels: [String],
    properties: [Property]
}
```

Definition and handling of relationship keys. A relationship key requires more information to specify as relationships are not typically looked up on their own with only type and property information. To uniquely identify a relationship we need the key of the start node, the key of the end node, the type of the relationship, and any properties which make up the key.

A relationship can only be connected to one start node, one end node, and can only have a single type. However, like nodes, relationships can have multiple properties and there is no distinction in a property graph database whether a specific property is part of a key. Upon inspection of a relationship there is no telling which properties, if any, will be part of the key. For relationships it is only necessary to specify a property key if it is expected that between two nodes, there will be multiple relationships of the same type. For example, consider this case:

(a:A)-[:NEXT]→(b:B)

If there can only be 1 NEXT relationship between A and B, relationship properties do not need to be part of the key. In a different case:

(a:A)-[:NEXT {language: 'English'}]→(b:B)
(a:A)-[:NEXT {language: 'Spanish'}]→(b:B)

Here there would be no way to uniquely identify the relationship, unless we also include 'language' as part of the key. The definition of the relationship key is shown below in pseudo GraphQL. The startNodeKey and endNodeKey are expected to be constructed using the node key logic discussed in the previous section. The type is the Relationship Type, and the key properties, if any, are determined by the schema stored at the root node.

```
Relationship {
    key {
        startNodeKey: NodeKey
        endNodeKey: NodeKey
        keyProperties: [Property]
        type: String
    },
    type: String,
    properties: [Property]
}
```

Here is an example showcasing property schema for a Relationship Type at the root node.

```
"keyConfig_NodePattern": ["key"]
"relKeyConfig_RELATIONSHIP_PATTERN": ["key"]
```

The relKeyConfig property is parsed to state that 'RELATIONSHIP_PATTERN' has the 'key' property that makes up its relationship key.

To summarize, the Graph Document schema information is stored on the root node of a Graph Document. It contains enough information to run a graph traversal in a single query to gather up all nodes of the subgraph that make up the document. Since individual nodes and relationships of the subgraph do not know how they are uniquely identified, the schema information in the root node is used to construct keys for the nodes and relationships. These keys allow individual nodes and relationships to be looked up, which enables them to be updated, deleted, or for the subgraph to be extended.

The generalized data structures enable the same application server and database code to be reused, allowing new types of Graph Documents to be created using UI code alone, without writing Graph Document specific Cypher queries.

Referring to FIG. 6, in the example shown, at 602 schema data for a Graph Document is read from a root node of the subgraph associated with the Graph Document. At 604, the schema data is read at 602 is used to retrieve, in a single query, all nodes comprising the Graph Document subgraph. If there is any update to data comprising the Graph Document (e.g., addition, deletion, modification) (606), at 608 only those nodes affected by the update are changed. In some embodiments, changes to individual nodes made at the client side may be auto-saved, e.g., to a server, as in the processes of FIGS. 4A and 4B. Nodes not affected by changes are not updated or saved. The process 600 continues, with subsequent updates to changed nodes, if any, being received and persisted to the graph database (606, 608), until the process 600 is done (610), e.g., the client application/tool being used to retrieve and modify the Graph Document is closed and/or an indication is received that use of the Graph Document has ended.

In various embodiments, a client side graphical user interface is generated and displayed to enable a user to define and/or refine a data model generated and stored as a graph, as disclosed herein. In various embodiments, the user interface includes modes and features to define graph patterns, such as node patterns and relationship patterns. In various embodiments, the patterns may be used to construct or validate queries and/or to infer or refine a data model.

In various embodiments, one or more of the following techniques may be employed to use a data model to define a pattern:

1. Displaying clickable Node Labels buttons from the data model
2. Displaying pop-up clickable Relationship Type/Node Labels from the data model
3. Graphically displaying the data model itself, and clicking on Node Labels and Relationship Types A fourth method, adding a new general node pattern and editing it, is also available, in various embodiments. Upon edit, Node Labels and Relationship Types from the data model are available via searchable dropdowns.

Figure 7A:
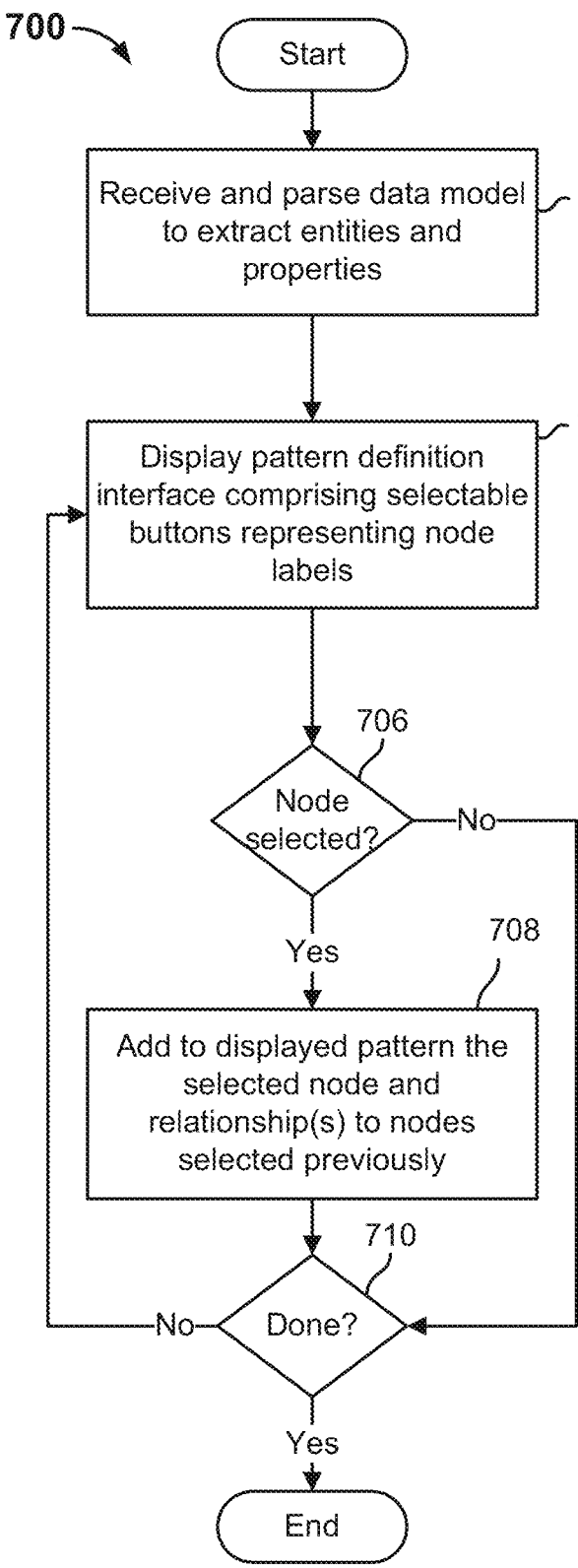
FIG. 7A is a flow diagram illustrating an embodiment of a process to iteratively receive and display, via a graphical user interface, a definition of a pattern.

FIG. 7A is a flow diagram illustrating an embodiment of a process to iteratively receive and display, via a graphical user interface, a definition of a pattern. In various embodiments, client-side user interface code may be executed at a client to perform the process 700. In various embodiments, the process 700 is used to implement the first technique listed above to provide a user interface to define a graph pattern, i.e., displaying clickable Node Labels buttons from the data model.

In the example shown, at 702 a data model is received and parsed to extract entities (e.g., nodes, relationships) and properties. At 704, a pattern definition graphical user interface that includes selectable buttons or other labeled visual icons representing node labels extracted at 702 is generated and displayed. Upon a button or other icon representing a node label being selected via the user interface (706), at 708 a graphical representation of a node having that node label is added to a displayed graphical and query statement representation of the pattern illustrated as a graph, along with any relationship(s) by which the newly added node is associated with other nodes selected previously to be included in the pattern, according to the data model received at 702. The process 700 continues until done (710), with the displayed graphical and query statement representation of the pattern being updated as nodes are added or removed (704, 706, 708), if any.

Figure 7B:
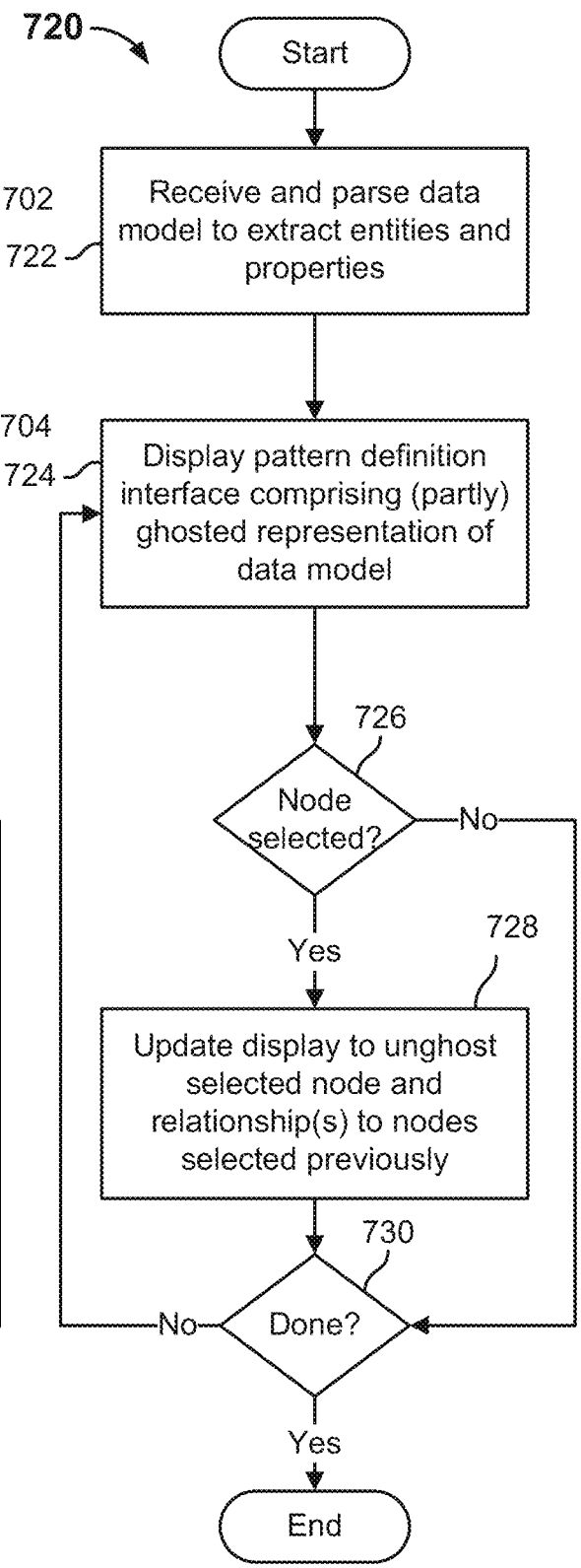
FIG. 7B is a flow diagram illustrating an embodiment of a process to iteratively receive and display, via a graphical user interface, a definition of a pattern.

FIG. 7B is a flow diagram illustrating an embodiment of a process to iteratively receive and display, via a graphical user interface, a definition of a pattern. In various embodiments, client-side user interface code may be executed at a client to perform the process 720. In various embodiments, the process 720 is used to implement the third technique listed above to provide a user interface to define a graph pattern, i.e., graphically displaying the data model itself, and clicking on Node Labels and Relationship Types as displayed to define the pattern.

In the example shown in FIG. 7B, at 722 a data model is received and parsed to extract entities (e.g., nodes, relationships) and properties. At 724, a pattern definition graphical user interface that includes an at least partly "ghosted" (or otherwise visually minimized) representation of the data model, e.g., as a graph. If a ghosted or otherwise minimized representation of a node is selected (726), at 728 the node is un-ghosted (or otherwise no longer minimized) and a visual representation and/or query statement expression of the pattern is updated to include the node and any relationship(s) to other nodes added previously to the pattern.

The process 720 continues until done (730), with the displayed graphical and query statement representation of the pattern being updated as nodes are added or removed (724, 726, 728), if any.

Figure 8A:
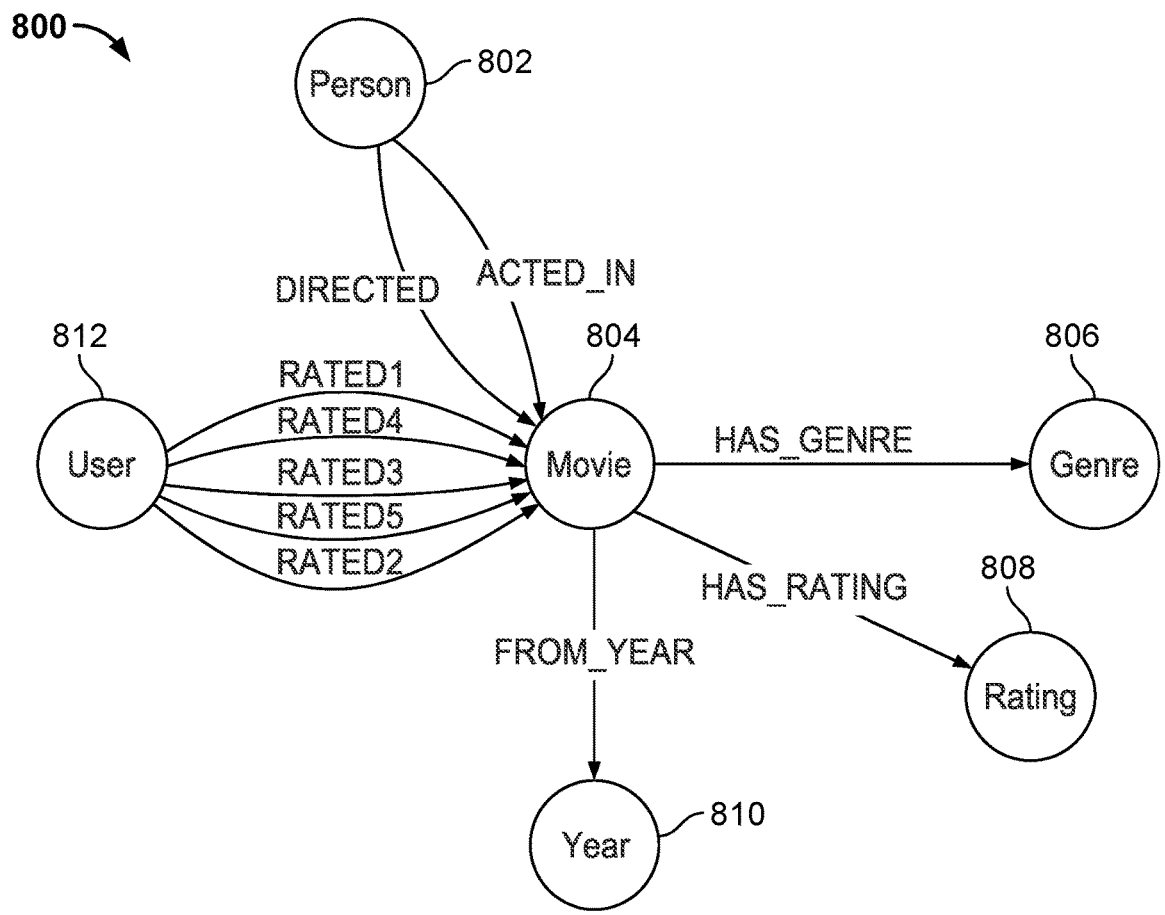
FIG. 8A is a diagram illustrating an example of a graph stored in an embodiment of a graph database system.

FIG. 8A is a diagram illustrating an example of a graph stored in an embodiment of a graph database system. The Node Labels of the data model 800 are Person 802, Movie 804, Genre 806, Rating 808, Year 810, and User 812. The Relationship Types of the data model are ACTED_IN, DIRECTED, HAS_GENRE, HAS_RATING, FROM_YEAR, and RATED1, etc. In various embodiments, a graph as shown in FIG. 8A is used visually to help build conforming Cypher™ or other query/graph patterns, as in the following examples.

Figure 8B:
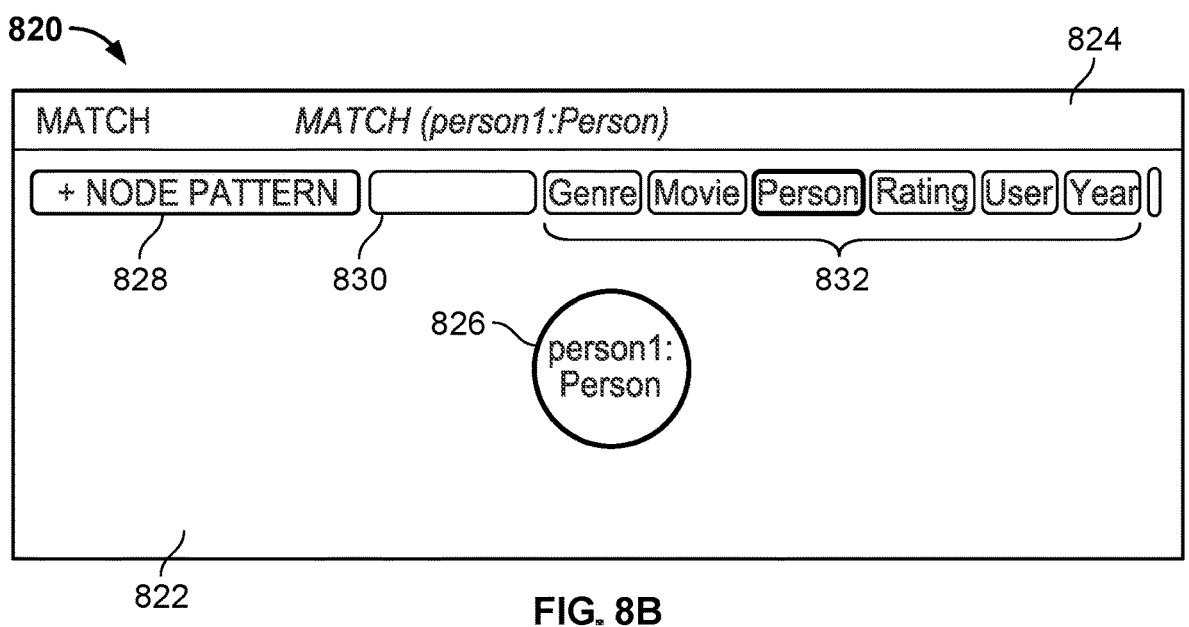
FIG. 8B is a block diagram illustrating an example of a pattern definition graphical user interface in an embodiment of a graph database system.

FIG. 8B is a block diagram illustrating an example of a pattern definition graphical user interface in an embodiment of a graph database system. In the example shown, user interface 820 includes a pattern definition visual display area 822 and a query statement expression area 824. In the example shown, a node pattern (so far) comprising a single node labeled "Person" 826 has been selected and is displayed. An "add new node pattern" button 828 enables a new node pattern to be defined and added to the pattern, such as by defining and editing a new node label. A search box 830 enables node patterns to be identified by searching for a node label. A set of selectable node label buttons 832 is derived from a data model, as in the process 700. The interface 820 is updated in response to a node label button 832 being selected, e.g., by adding an associated node to the pattern, along with relationships by which the added node label is associated with other node labels added previously to the pattern, according to the data model.

The Node Labels presented as clickable buttons are taken from the selected data model. When the user clicks on a Node Label button, a corresponding Node Pattern is added to the Cypher Pattern, e.g., as displayed in query statement expression area 824. Cypher Node Patterns have the format (<variable>:<node labels>{<properties>}). In the example shown, when the user clicked on a button corresponding to the Person node label, a Cypher Node Pattern (person1: Person) was generated and displayed in the query statement expression area 824 and the graphical representation 826 of the Person node label was added to the pattern as displayed in pattern definition visual display area 822 of user interface 820.

Figure 8C:
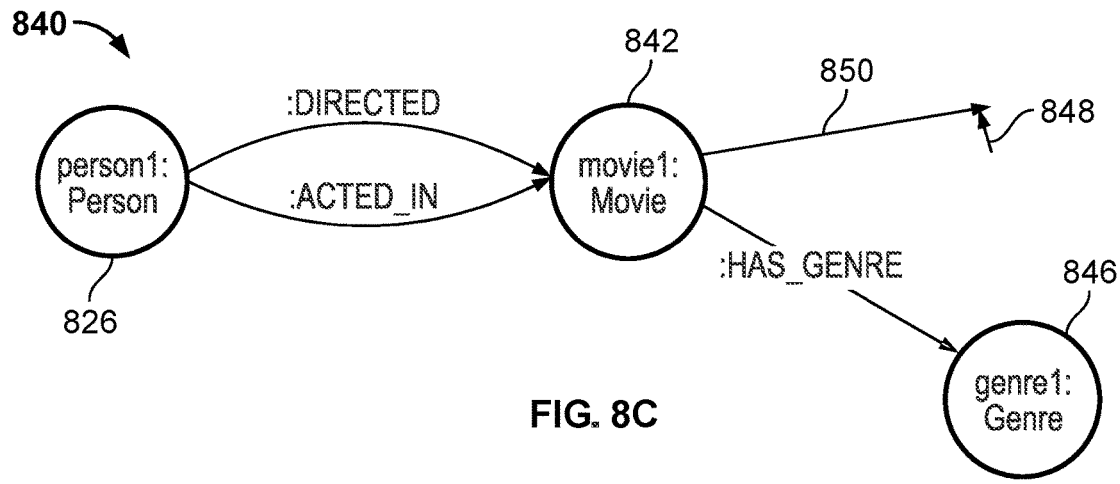
FIG. 8C is a block diagram illustrating an example of a pattern definition graphical user interface in an embodiment of a graph database system.

FIG. 8C is a block diagram illustrating an example of a pattern definition graphical user interface in an embodiment of a graph database system. In the state shown, display 840 reflects an update to user interface 820 in which the Movie node label 842 and Genre node label 846, along with relationships defined in the data model between the nodes 826, 842, and 846. In the state shown in FIG. 8C, the user seeks to extend the pattern by user cursor 848 to click on and drag relationship definition arrow 850 out from the Movie node label 842 to create a new Relationship Pattern.

Figure 8D:
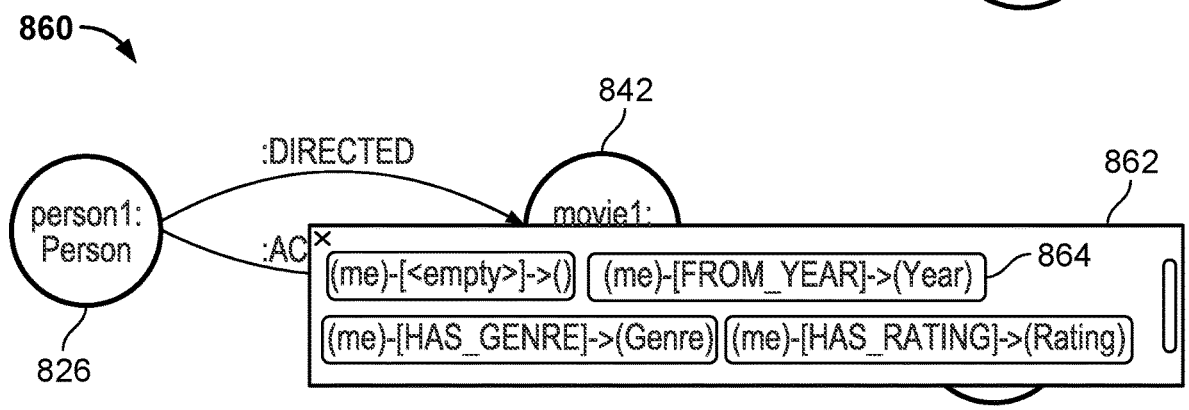
FIG. 8D is a block diagram illustrating an example of a pattern definition graphical user interface in an embodiment of a graph database system.

FIG. 8D is a block diagram illustrating an example of a pattern definition graphical user interface in an embodiment of a graph database system. In the state shown in FIG. 8D, the data model has been used to drive the available choices for the user, in response to the input illustrated in FIG. 8C. In particular, the display 860 includes a popup window 862 added in response to the user dragging arrow 850 out from the (movie1:Movie) node pattern 842, as shown in FIG. 8C, and releasing the mouse. The choices presented in the popup 862 are derived based on the source node pattern, in this case (movie1:Movie) and the selected data model. The Movie Node Label of the node pattern is used to lookup the corresponding entry in the data model. In the data model, Movie has outbound relationships to Node Labels Genre via HAS_GENRE, Rating via HAS_RATING, and Year via FROM_YEAR, the latter being represented in FIG. 8D by button 864. These choices are gathered from the data model and presented in the popup 862, along with a button to define a new relationship pattern not (yet) found in the data model. When the user clicks one of the choices, the data model information is used to create a relationship pattern and node pattern, in various embodiments.

In some embodiments, when connecting between two existing Node Patterns, both inbound and outbound relationships are shown as a convenience to the user.

Figure 8E:
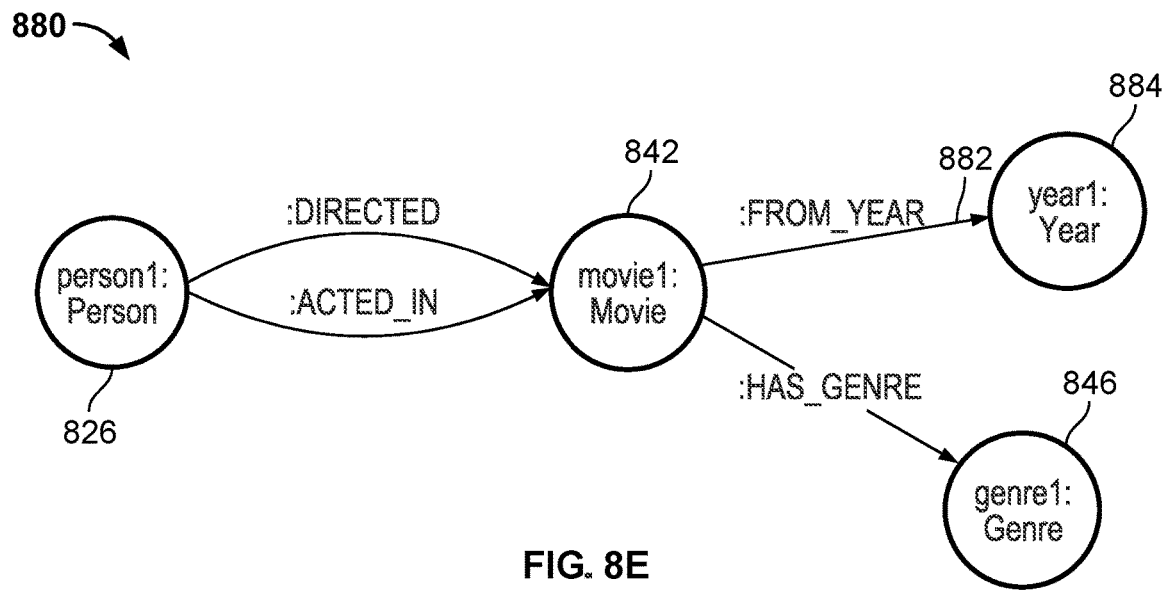
FIG. 8E is a block diagram illustrating an example of a pattern definition graphical user interface in an embodiment of a graph database system.

FIG. 8E is a block diagram illustrating an example of a pattern definition graphical user interface in an embodiment of a graph database system. In the state shown in FIG. 8E, display 880 represents an update to the display 860 of FIG. 8D such as may be provided in response to the user selected the [:FROM YEAR]→(year1:Year) relationship pattern button 864 in the popup window 862 of FIG. 8D. As shown in FIG. 8E, the displayed pattern has been updated to include the relationship :FROM_YEAR, represented by arrow 882, and node label Year 884.

In various embodiments, the displays 840, 860, and 880 are provided as one display area of a displayed user interface that includes a pattern query language expression display area, such as query statement expression area 824 of FIG. 8B. In various embodiments, adding the relationship 882 and node 884 as in FIGS. 8C, 8D, and 8E, would result in a corresponding change in the pattern expressed as a query statement as displayed in the query statement expression display area of the displayed user interface.

Figure 8F:
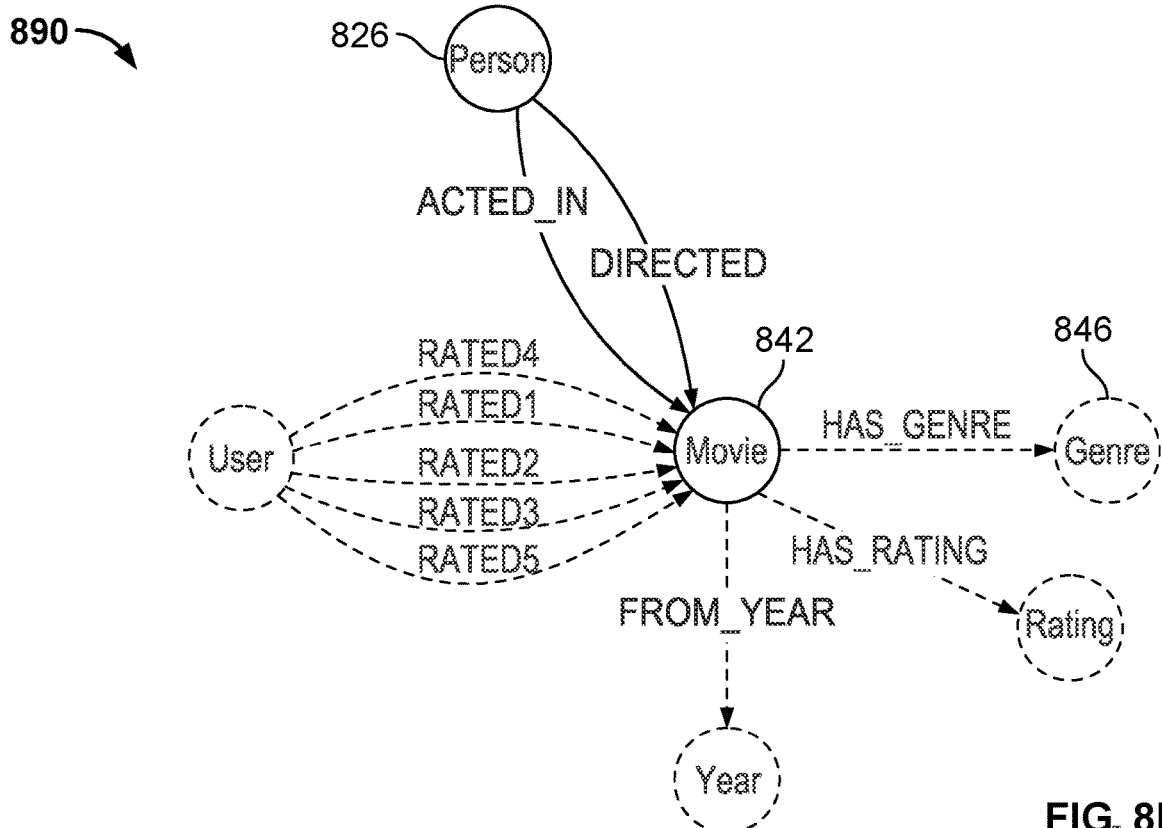
FIG. 8F is a block diagram illustrating an example of a pattern definition graphical user interface in an embodiment of a graph database system.

FIG. 8F is a block diagram illustrating an example of a pattern definition graphical user interface in an embodiment of a graph database system. The display 890 of FIG. 8F is an example of a user interface to build/define a pattern from a display of the data model. In the example shown, the entire model is displayed and user interaction with the entities represented in the display is enabled. In some embodiments, a user selects a "data model" user mode to access an interface such as display 890.

In various embodiment, if a Node Label or Node Label-Relationship Type→Node Label pattern is used in a defined pattern, the corresponding data model items are un-ghosted. This enables the user to see what portion of the data model is being used by the pattern. In the state shown in FIG. 8F, the Person-DIRECTED→Movie and Person-ACTED_IN→Movie paths are included in the pattern definition and, as a result, those items are shown un-ghosted in the data model display 890.

In various embodiments, updating a pattern via any of the techniques mentioned above will update the data model display. The data model panel displays Node Labels and Relationship Types in two modes: ghosted and un-ghosted. In some embodiments, ghosted mode shows items in a faded, dashed line display, while un-ghosted mode shows items in full color, solid line display.

Figure 8G:
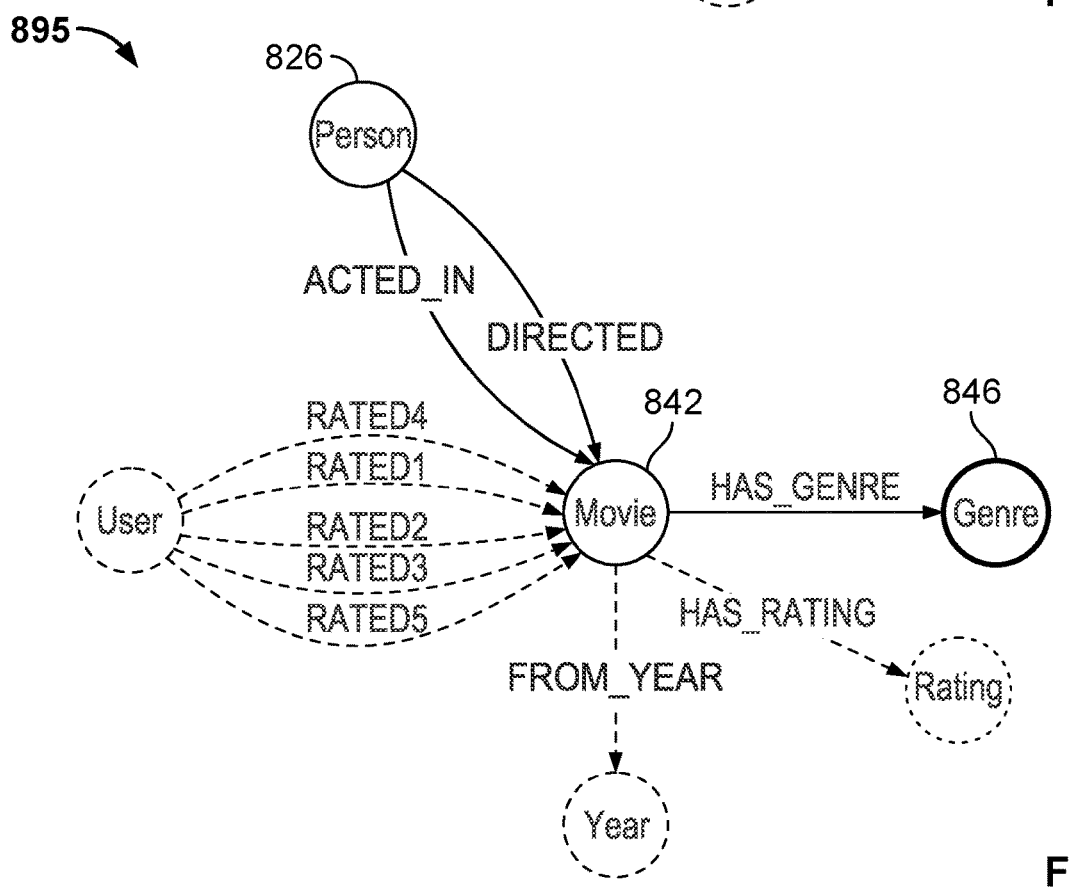
FIG. 8G is a block diagram illustrating an example of a pattern definition graphical user interface in an embodiment of a graph database system.

FIG. 8G is a block diagram illustrating an example of a pattern definition graphical user interface in an embodiment of a graph database system. In the state shown in FIG. 8G, the display 895 has been updated in response to the user clicking on Genre node 846 in the data model as displayed. Upon clicking, the defined pattern is extended to include the Genre node 846 and the HAS_GENRE relationship type included in the Movie-HAS_GENRE-→Genre pattern. In various embodiments, instead of adding a standalone Genre node 846 pattern, the pattern is examined in the context of the data model, and it is determined that Genre can be added by adding the HAS_GENRE relationship pattern originating from Movie, because this is what the data model specifies. Using this technique, a pattern can be quickly built by clicking on Relationship Types and Node Labels in the data model window. Not only can it be quickly built, but by using the data model, the built pattern automatically conforms to the data model.

Figure 9:
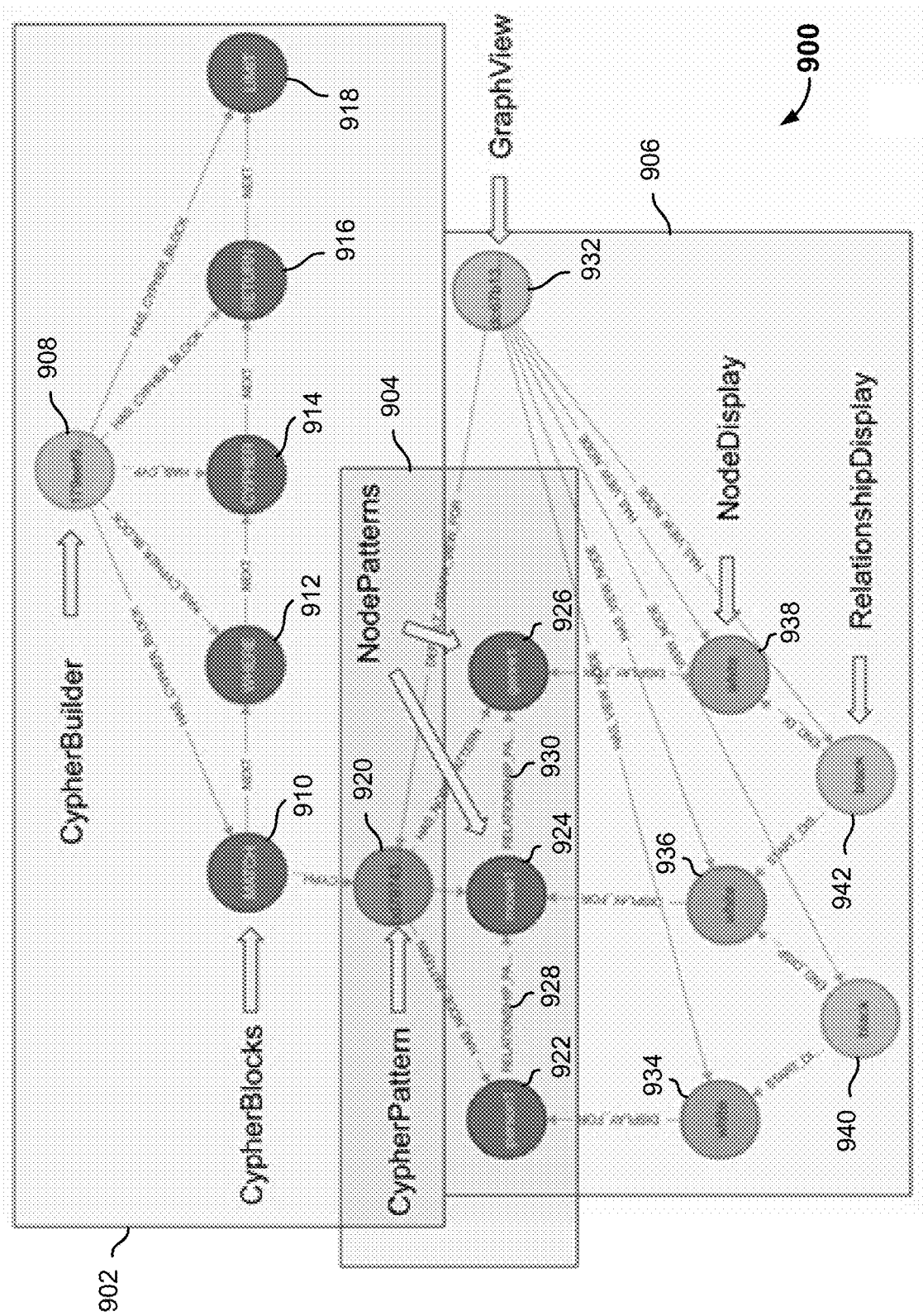
FIG. 9 is a diagram illustrating an example of storing as a graph data defining a query statement, patterns used to construct the query statement, and view data indicating parameters to display a representation of data in a graphical user interface, in an embodiment of a graph database system.

FIG. 9 is a diagram illustrating an example of storing as a graph data defining a query statement, patterns used to construct the query statement, and view data indicating parameters to display a representation of data in a graphical user interface, in an embodiment of a graph database system. In the example shown, graph 900 represents the data structures used to store visually-built Cypher™ statements stored as a graph. Each major Cypher™ keyword (e.g., MATCH, WHERE, CYPHER, RETURN, LIMIT) gets translated into a Cypher Block node, e.g., nodes 910, 912, 914, 916, and 918, in the example shown, each related to root node 908, which represents the Cypher Builder instance, in this example, and depending on the level of processing, can contain a subgraph of additional information, such as the Cypher Pattern 920, node patterns 922, 924, and 926, another information nodes and relationships comprising the graph 900, as shown.

In various embodiments, storing query statement, pattern, and display information as a graph, as in graph 900, paves the way for performing Cypher™ (or other) queries on a subgraph which represents a different Cypher™ query. For instance, consider this text based Cypher™ query:

```
MATCH
(person1:Person)-[:ACTED_IN]->(movie1:Movie)-[:HAS_GENRE]-
>(genre1:Genre)
WHERE person1.name <> "N/A"
WITH person1.name as actor, genre1.name as genre, count(movie1)/5
as score
RETURN actor, genre, score
LIMIT 50
```

The above query includes several sub-clauses, each starting with a Cypher™ keyword (e.g., MATCH, WHERE, etc.). For instance, RETURN actor, genre, score, is a sub-clause starting with the RETURN keyword, and contains the expressions actor, genre, and score. These sub-clauses are represented as CypherBlock nodes in the subgraph representation of the query, e.g., nodes 910, 912, 914, 916, and 918 of FIG. 9.

As illustrated in FIG. 9, for each Cypher Block, the graph 900 may include a Cypher Pattern for that block. For example, in graph 900 the Cypher Block MATCH 910 is related to Cypher Pattern 920, which in turn is related to the person, movie, and genre node patterns 922, 924, and 926, respectively, which are related by the relationship patterns 928 and 930. Together, these node patterns and relationship patterns encode and represent the MATCH portion of the above Cypher™ query, i.e., MATCH (person1: Person)-[:ACTED_IN]-→(movie1:Movie)-[:HAS_GENRE]→(genre1:Genre).

In various embodiments, the subgraph storage structure for the above query includes graph 900 of FIG. 9. In the example shown, each of Cypher™ Builder subgraph 902, Cypher™ Pattern subgraph 904, and GraphView subgraph 906 represents a Graph Document, as described above. The root node of each, e.g., nodes 908, 920, and 932, can be read to obtain the data required to retrieve the entire subgraph in a single query.

In the example shown in FIG. 9, the Cypher™ Builder subgraph 902 contains the CypherBuilder node 908, CypherBlock nodes 910, 912, 914, 916, and 918, and CypherPattern node 920. The CypherBuilder node is the root node for the subgraph which represents the query. Each CypherBlock node represents a sub-clause of the Cypher query. There are specific labels for MATCH, WHERE, RETURN, and LIMIT. The CYPHER block 914 contains the WITH clause in the query, and allows for arbitrary Cypher text to be stored. The CypherBlocks are connected by NEXT relationships to maintain the ordering of the overall Cypher statement. The MATCH CypherBlock node points to a CypherPattern node 920 which contains a subgraph representation of the Cypher pattern in the MATCH clause.

The Cypher™ Pattern subgraph 904 contains the CypherPattern root node 920 and NodePattern nodes 922, 924, and 926. The NodePattern nodes are connected via RELATIONSHIP_PATTERN relationships 928, 930. All together they represent the Cypher pattern:
(person1    Person)-[:ACTED_IN]→(movie1:Movie)-[:HAS_GENRE]→(genre1: Genre)

There are specific properties captured for each NodePattern and RelationshipPattern. A NodePattern contains variable and nodeLabels properties. The key/value representation of (person1:Person) would be {variable: 'person1', nodeLabels: ['Person'] }. The variable is pictured in the diagram. A RELATIONSHIP_PATTERN relationship contains the properties needed to represent a RelationshipPattern. Included in these properties are variable and types. The key/value representation of [:ACTED_IN] would be {variable: null, types: ['ACTED_IN'] }.

The GraphView subgraph 906 contains GraphView node 932, NodeDisplay nodes 934, 936, and 938, and RelationshipDisplay nodes 940, 942. GraphView 932 is the root node of the subgraph. NodeDisplay nodes 934, 936, 938 and RelationshipDisplay nodes 940, 942 "annotate" the Cypher Pattern subgraph. Their purpose is to store information needed to display the Cypher pattern in a UI, and include properties such as color, position, and stroke width.

In various embodiments, techniques disclosed herein are used to do one or more of the following:
Build and store a data model as a graph
Build and store Cypher™ or other graph query statements as a graph
Each Cypher™ statement records the ID of its associated data model In various embodiments, in light of the above, a Cypher™ statement can be run as disclosed herein to validate whether stored Cypher™ statements conform to a data model.

Figure 10:
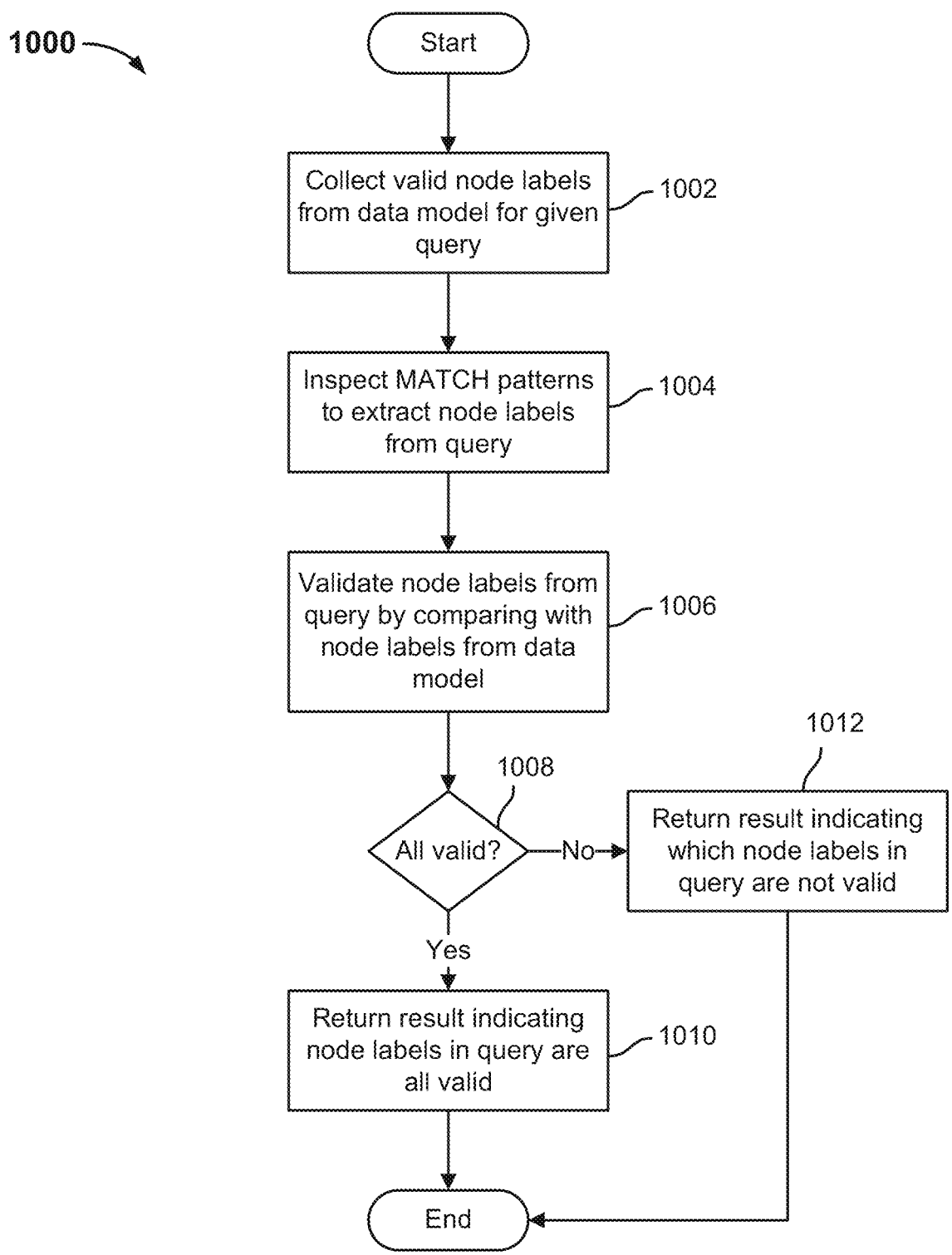
FIG. 10 is a flow diagram illustrating an embodiment of a process to validate query statements in an embodiment of a graph database system.

FIG. 10 is a flow diagram illustrating an embodiment of a process to validate query statements in an embodiment of a graph database system. In various embodiments, the process 1000 of FIG. 10 may be performed by a graph database application server, such as server 110 of FIG. 10.

The following is an example of determining if the Node Labels used in the Cypher query Path Patterns conform to their associated data model, in various embodiments:

```
// collect valid Node Labels from the data model for the given
Cypher query
WITH "Movies Model" as modelTitle
MATCH (cypher:CypherBuilder),
(model:DataModel)-[:HAS_METADATA]-
>(metadata:DataModelMetadata {title:modelTitle})
WHERE cypher.dataModelKey = model.key
WITH cypher, model, metadata.title as dataModelName
MATCH (model)-[:HAS_NODE_LABEL]->(nl)
WITH cypher, collect(nl.label) as dataModelNodeLabels,
dataModelName
```

```
// inspect MATCH and OPTIONAL MATCH Node Patterns
MATCH (cypher:CypherBuider)-[:HAS_CYPHER_BLOCK]-
>(matchBlock:CypherBlock),
    (cypher)-[:HAS_METADATA]->(cypherMetadata)
WHERE matchBlock.keyword IN ['MATCH','OPTIONAL MATCH']
WITH cypher, cypherMetadata, matchBlock, dataModelNodeLabels,
dataModelName
MATCH
(matchBlock)-[:CYPHER_PATTERN]->(pattern:CypherPattern)-
[:HAS_NODE_PATTERN]->(nodePattern:NodePattern)
// If all Node Pattern node labels used in the Path Pattern exist
in the data model then "Yes", otherwise "No"
WITH cypherMetadata, dataModelName, nodePattern,
    CASE WHEN apoc.coll.containsAll(dataModelNodeLabels,
coalesce(nodePattern.nodeLabels, [ ]))
        THEN "Yes"
        ELSE "No"
    END as conformsToDataModel
RETURN cypherMetadata.title as cypherName, dataModelName,
nodePattern.key as nodePatternKey, nodePattern.nodeLabels as
nodePatternNodeLabels, conformsToDataModel
ORDER BY conformsToDataModel, cypherName,
nodePatternNodeLabels
```

This query when run would print out which Node Patterns conform and which do not conform to the data model.

Referring to FIG. 10, in the example shown, at 1002 valid node labels are collected from a data model with which a query is associated. For At 1004, MATCH and OPTIONAL MATCH patterns in the query are inspected to extract node labels from the query. At 1006, the node labels extracted from the query and compared to the valid node labels collected from the data model to validate the query labels. If all node labels extracted from the query are determined to be valid (1008), at 1010 a result is returned indicating all node labels in the query are valid. Otherwise, at 1012 a result is returned that includes an identification of node labels used in the query that were not determined to be valid.

Figure 11:
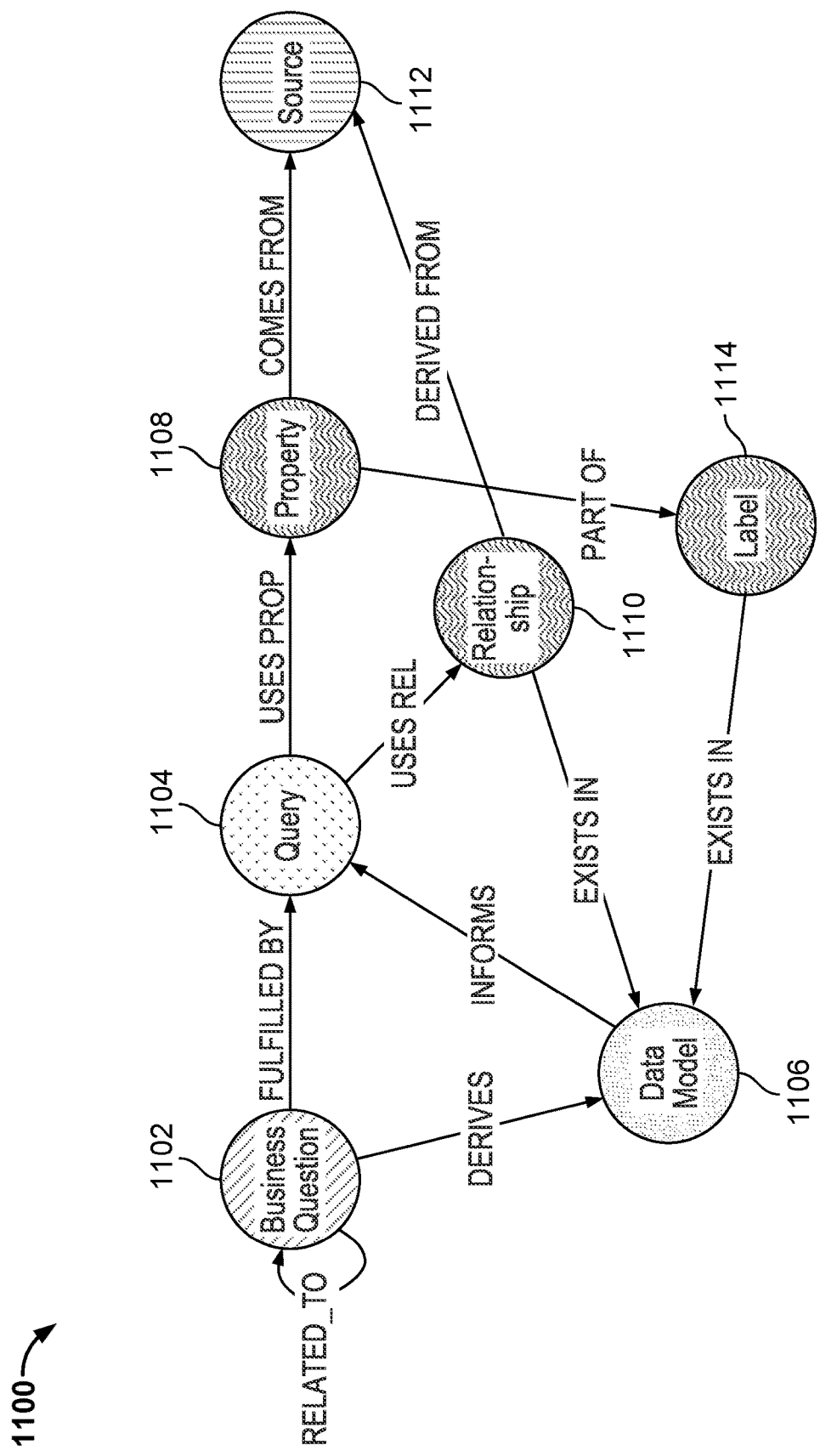
FIG. 11 illustrates a graph to represent and store data defining a data model and its relationship to associated business questions and data sources.

FIG. 11 illustrates a graph to represent and store data defining a data model and its relationship to associated business questions and data sources. In the example shown, graph 1100 relates Business Questions 1102 to corresponding instance of Query 1104 and Data Model 1106. Property 1108 and Relationship 1110 nodes are defined, along with their respective relationships to data sources each represented by an instance of Source 1112 along with the Labels 1114 defined for Property 1108.

In various embodiments, a graph such as graph 1100 of FIG. 11 is stored and used by a system as disclosed herein to facilitate and/or perform one or more of the following:
Impact Analysis
  Change to properties impacts queries and business questions
  Change to business questions impacts model and specific queries
Traceability
  All business requirements/questions addressed and how
  Identify unused properties and relationships in the model
Lineage
  Complete lineage from Questions to data sources
  History of changes to questions, queries, and model
  Source to Target Map Generation
  Supports automation of data ingestion In various embodiments, techniques disclosed herein are used to leverage the capabilities of a property graph database system, such as Neo4j™, to facilitate the definition and storage of a data model for an underlying graph database and/or to define and store as a graph Cypher™ or other query statements associated with a data model.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a memory or other data storage device; and
  a processor coupled to the memory or other data storage device and configured to:
    receive data defining one or more aspects of a data model associated with a graph database;
    store as a graph a set of data that represents the data model, the graph including one or more nodes to represent each of the following: data model metadata, one or more node labels comprising the graph database, one or more relationship types of the graph database, and one or more property definitions each associated with a property of at least one of a node label and a relationship type of the graph database, wherein the graph is stored as a subgraph of a global graph, the global graph including a plurality of subgraphs, each subgraph representing a corresponding data model of a graph database associated with that data model and each subgraph has associated therewith a universally unique identifier (UUID) of the data model with which the subgraph is associated;
    receive a request associated with the data model and allow access to the data model based at least in part on a determination that a user with which the request is associated is authorized to access the data model;
    receive a request to write to the set of data that represents the data model and to add the UUID to an entity name included in the request;
    receive a request to read data comprising the set of data that represents the data model;
    retrieve response data from the set of data, the response data including an identification of one or more entities comprising the graph, the identification including the UUID; and
    remove the UUID from the response data prior to sending at least a subset of the response data in response to the request.

2. The system of claim 1, wherein the property definition defines a data type.

3. The system of claim 1, wherein the graph comprises a subgraph of a global graph, the subgraph including data usable to retrieve the entire subgraph in a single query.

4. The system of claim 3, wherein the subgraph comprises an instance of a graph document and the global graph includes a plurality of graph documents, each having a subgraph root node that includes data usable to retrieve the associated subgraph in a single query.

5. The system of claim 1, wherein the processor is configured to determine at least a portion of the data model by reverse engineering a query statement associated with the graph database.

6. The system of claim 1, wherein the processor is configured to use the data model to provide a visual tool to define a pattern associated with the graph database.

7. The system of claim 6, wherein the processor is configured to use the data model at least in part by extract from the data model a plurality of node labels and including in a graphical user interface of the visual tool a set of selectable buttons, each associated with a corresponding node label, and wherein the processor is further configured to generate and include in one or both of a visual representation of the pattern and a query statement expression of the pattern, in response to user selection of one of the selectable buttons, a node pattern corresponding to a node label associated with the selected button.

8. The system of claim 7, wherein the processor is further configured to include in one or both of the visual representation of the pattern and the query statement expression of the pattern a relationship between a first node associated with the node label associated with the selected button and a second node associated with a second node label added previously to the pattern.

9. The system of claim 8, wherein the processor is further configured to store as a pattern graph data representing the pattern defined via the visual tool.

10. The system of claim 1, wherein the processor is configured to validate a query statement associated with the graph database at least in part by using the data model to determine as a set of valid node labels for the graph database, comparing the determined set of valid node labels to a corresponding set of node labels extracted from the query statement, and returning a result indicating which, if any, of the node labels extracted from the query statement is or are invalid.

11. A system comprising:
a memory or other data storage device; and
a processor coupled to the memory or other data storage device and configured to:
receive data defining one or more aspects of a data model associated with a graph database;
store as a graph a set of data that represents the data model, the graph including one or more nodes to represent each of the following: data model metadata, one or more node labels comprising the graph database, one or more relationship types of the graph database, and one or more property definitions each associated with a property of at least one of a node label and a relationship type of the graph database;
store change tracking data to track changes made at a client system to data comprising the graph, including by tracking which nodes of the graph are affected by changes made at the client system;
determine to auto-save changes; and
use the change tracking data to save to the graph as stored in a graph database, including by using the change tracking data to identify a subset of entities comprising the graph to be updated.

12. The system of claim 11, wherein the change tracking data includes for each of a plurality of entities comprising the graph a changed flag and wherein the processor is configured to set the changed flag to a value indicating the corresponding entity has been changed.

13. The system of claim 12, wherein the change tracking data includes a timestamp indicating a time associated with a change to the corresponding entity.

14. The system of claim 13, wherein the processor is configured to save the changes to the graph by creating and sending to a remote graph database application server a JSON or other package that includes change data for each entity determined to have been changed.

15. The system of claim 14, wherein data models may be built collaboratively over the internet.

16. The system of claim 14, wherein data models are firewalled to members of a particular organization.

17. A method, comprising:
receiving data defining one or more aspects of a data model associated with a graph database;
storing as a graph a set of data that represents the data model, the graph including one or more nodes to represent each of the following: data model metadata, one or more node labels comprising the graph database, one or more relationship types of the graph database, and one or more property definitions each associated with a property of at least one of a node label and a relationship type of the graph database, wherein the graph is stored as a subgraph of a global graph, the global graph including a plurality of subgraphs, each subgraph representing a corresponding data model of a graph database associated with that data model and each subgraph has associated therewith a universally unique identifier (UUID) of the data model with which the subgraph is associated;
receiving a request associated with the data model and allow access to the data model based at least in part on a determination that a user with which the request is associated is authorized to access the data model;
receiving a request to write to the set of data that represents the data model and to add the UUID to an entity name included in the request receiving a request to read data comprising the set of data that represents the data model;
retrieving response data from the set of data, the response data including an identification of one or more entities comprising the graph, the identification including the UUID; and
removing the UUID from the response data prior to sending at least a subset of the response data in response to the request.

18. A non-transitory computer readable medium including a computer program product, the computer program product comprising computer instructions for:
receiving data defining one or more aspects of a data model associated with a graph database;
storing as a graph a set of data that represents the data model, the graph including one or more nodes to represent each of the following: data model metadata, one or more node labels comprising the graph database, one or more relationship types of the graph database, and one or more property definitions each associated with a property of at least one of a node label and a relationship type of the graph database, wherein the graph is stored as a subgraph of a global graph, the global graph including a plurality of subgraphs, each subgraph representing a corresponding data model of a graph database associated with that data model and each subgraph has associated therewith a universally unique identifier (UUID) of the data model with which the subgraph is associated;
receiving a request associated with the data model and allow access to the data model based at least in part on a determination that a user with which the request is associated is authorized to access the data model;
receiving a request to write to the set of data that represents the data model and to add the UUID to an entity name included in the request;
receiving a request to read data comprising the set of data that represents the data model;
retrieving response data from the set of data, the response data including an identification of one or more entities comprising the graph, the identification including the UUID; and removing the UUID from the response data prior to sending at least a subset of the response data in response to the request.

19. A method, comprising:
receiving data defining one or more aspects of a data model associated with a graph database;
storing as a graph a set of data that represents the data model, the graph including one or more nodes to represent each of the following: data model metadata, one or more node labels comprising the graph database, one or more relationship types of the graph database, and one or more property definitions each associated with a property of at least one of a node label and a relationship type of the graph database;
storing change tracking data to track changes made at a client system to data comprising the graph, including by tracking which nodes of the graph are affected by changes made at the client system;
determining to auto-save changes; and
using the change tracking data to save to the graph as stored in a graph database, including by using the change tracking data to identify a subset of entities comprising the graph to be updated.

20. A non-transitory computer readable medium including a computer program product, the computer program product comprising computer instructions for:
receiving data defining one or more aspects of a data model associated with a graph database;
storing as a graph a set of data that represents the data model, the graph including one or more nodes to represent each of the following: data model metadata, one or more node labels comprising the graph database, one or more relationship types of the graph database, and one or more property definitions each associated with a property of at least one of a node label and a relationship type of the graph database;
storing change tracking data to track changes made at a client system to data comprising the graph, including by tracking which nodes of the graph are affected by changes made at the client system;
determining to auto-save changes; and
using the change tracking data to save to the graph as stored in a graph database, including by using the change tracking data to identify a subset of entities comprising the graph to be updated.

* * * * *